United States Patent
Ota et al.

(10) Patent No.: US 6,612,513 B2
(45) Date of Patent: Sep. 2, 2003

(54) TAPE CASSETTE AND CASSETTE HOLDER

(75) Inventors: Shuichi Ota, Saitama (JP); Hiroshi Fujii, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/880,133

(22) Filed: Jun. 14, 2001

(65) Prior Publication Data

US 2002/0020773 A1 Feb. 21, 2002

(30) Foreign Application Priority Data

Jun. 16, 2000 (JP) ........................................ 2000-181207

(51) Int. Cl.$^7$ ........................ G11B 23/04; G11B 23/023
(52) U.S. Cl. ............................. 242/338.4; 242/347.1; 360/96.6; 360/132
(58) Field of Search ........................ 242/338.2, 338.4, 242/347, 347.1; 360/96.5, 96.6, 132

(56) References Cited

U.S. PATENT DOCUMENTS

| | | | | |
|---|---|---|---|---|
| 3,980,255 A | * | 9/1976 | Serizawa | 242/347.1 |
| 4,485,988 A | * | 12/1984 | Kikuya et al. | 242/347.1 |
| 4,697,702 A | * | 10/1987 | Urayama | 242/347.1 X |
| 4,935,895 A | * | 6/1990 | Ohyama | 360/96.5 |
| 5,240,200 A | * | 8/1993 | Nishimura et al. | 242/347 |
| RE34,927 E | * | 5/1995 | Meguro et al. | 360/96.5 |
| 5,615,066 A | * | 3/1997 | Shibata | 360/96.5 |

OTHER PUBLICATIONS

Fujii et al., US 2002/0020775 A1, U.S. patent application Publication, Feb. 21, 2002.*

* cited by examiner

*Primary Examiner*—Michael R. Mansen
*Assistant Examiner*—Minh-Chau Pham
(74) *Attorney, Agent, or Firm*—Rader, Fishman & Grauer PLLC; Ronald P. Kananen, Esq.

(57) ABSTRACT

Disclosed is a tape cassette which is loaded in a tape drive apparatus by a manner of inserting the tape cassette in a cassette holder and then moving the cassette holder relative to a main chassis of the tape drive apparatus. The tape cassette includes a mouth portion provided in a front portion of a cassette shell in such a manner as to be opened forward, upward, and downward. Part of a magnetic tape (tape-like recording medium) is positioned to cross the front end of the mouth portion. The tape cassette also includes a front lid for covering the front side of the magnetic tape. The front lid is opened when the tape cassette is inserted in the cassette holder. This tape cassette is characterized by including two side butting portions and two upper butting portions which are brought into contact with two side receiving portions and two upper receiving portions of the cassette holder when the tape cassette is inserted in the cassette holder. With this configuration, it is possible to ensure the positioning of the tape cassette to the cassette holder with an improved accuracy, and to loosen the dimensional accuracy of each of the tape cassette and cassette holder.

6 Claims, 22 Drawing Sheets

TAPE CASSETTE AND CASSETTE HOLDER

BACKGROUND OF THE INVENTION

The present invention relates to a new tape cassette, a new cassette holder, and particularly to a technique capable of ensuring, when a tape cassette is inserted in a cassette holder, the positioning of the tape cassette in the insertion direction with improved accuracy.

A known tape cassette is loaded in a tape drive apparatus by inserting the tape cassette in a cassette holder provided on the tape drive apparatus and turning or sliding the cassette holder to finish the loading of the tape cassette to the tape drive apparatus. Such a tape cassette is represented by aβ tape cassette, an 8 mm tape cassette, a DAT, a VHS tape cassette, or a DV tape cassette.

A front lid provided on the above-described tape cassette is opened when a cassette holder, in which the tape cassette has been inserted at a specific position, is moved (turned or moved up or down) relative to the tape drive apparatus. Accordingly, the positioning of the tape cassette to the cassette holder is performed in a state in which the front lid is closed.

FIGS. 20 and 21 show one example of an 8 mm tape cassette "a" having such a front lid.

In the tape cassette "a", a tape-like recording medium "c" crosses the front end of a mouth portion "b" from side to side, and a front lid "d" covers the front side of the recording medium "c" while a back lid "e" covers the back side of the recording medium "c" (see FIG. 21).

Right and left end portions of the lower edge of the front lid "d" have horizontally-elongated rectangular cutouts "f". Right and left end portions, corresponding to the cutouts "f", of a lower shell "g" have tongue pieces "h" projecting forward. In a closed state of the front lid "d", the tongue pieces "h" are fitted in the cutouts "f". At this time, the front end surfaces of the tongue pieces "h" are nearly at the same level as that of the surface of the front lid "d" in the horizontal direction (see FIG. 20). The front end surfaces of the tongues "h" are taken as butting portions "i" for performing the positioning of the tape cassette "a" to a cassette holder "j" in the insertion direction (see FIG. 21).

On the other hand, the cassette holder "j" has receiving portions "k" at positions corresponding to those of the butting portions "i" of the tape cassette "a" (see FIG. 22). The receiving portion "k" is formed by bending upward each of the right and left end portions of the rear edge of a receiving plate I for supporting the tape cassette "a" from below.

With respect to the front and rear sides of the cassette holder "j", the inlet side on which the tape cassette "a" is initially inserted is taken as the front side, and the depth side is taken as the rear side. To be more specific, the front side of the tape cassette "a" enters the front side of the cassette holder "j"and, accordingly, in the state that the tape cassette "a" is inserted in the cassette holder "j" the front/rear side of the tape cassette has an inverse relationship with the front/rear side of the cassette holder "j". The same is true for a tape cassette and a cassette holder that will be described later.

The tape cassette "a" is inserted in the cassette holder "j" in a lid closed state of the front lid "d", and then the butting portions "i" are brought into contact with the receiving portions "k" of the cassette holder "j". At this time, the insertion of the tape cassette "a" in the cassette holder "j" is ended and simultaneously the positioning of the tape cassette "a" to the cassette holder "j" is attained.

In addition, FIGS. 20 and 21 are perspective views of tape cassette "a" seen from the direction tilted rightward, upward, and FIG. 22 is a perspective view seen from the direction tilted leftward, upward. The tape cassette "a" is initially inserted in the front portion of the cassette holder "j" in the direction shown by an arrow D in FIG. 22.

The cassette holder "j" is then turned with respect to a tape drive apparatus (not shown), to carry the tape cassette "a" to a specific loading position in the tape drive apparatus. At this time, the front lid "d" and the back lid "e" of the tape cassette "a" are opened (see FIG. 21). The cassette loading is thus ended.

The above-described related art tape cassette "a", however, has a problem that when the tape cassette "a" is inserted in the cassette holder "j", the butting portions "i" may ride across the receiving portions "k" of the cassette holder "j". Such a situation makes it impossible not only to perform the positioning of the tape cassette "a" to the cassette holder "j" but also to perform the loading of the tape cassette "a" in the tape drive apparatus.

The above problem can be solved by enlarging the receiving portions "k" of the cassette holder "j"; however, if the receiving portions "k" are enlarged, they may interfere with the front lid "d" at the time of opening the front lid "d". Accordingly, it is undesirable to enlarge the receiving portions "k"; rather, it is desirable to make the receiving portions "k" as small as possible in order to eliminate the interference of the receiving portions "k" with the front lid "d".

Enlargement of the butting portions "i" of the tape cassette "a" may be considered; however, if the butting portions "i" are enlarged, they may interfere with the extraction of the tape-like recording medium "c" at the time of forming the tape path. Accordingly, the butting portions "i" cannot be enlarged from a practical viewpoint.

Prevention of the front end of the tape cassette "a" inserted in the cassette holder "j" (the rear end of the cassette holder "j") from being deviated upward by extending the upper plate of the cassette holder "j" toward the rear end portion as much as possiblealso may be considered; however, actually, the upper plate of the cassette holder "j" cannot be extended up to the rear end portion in consideration of the fact that the front lid "d" is turned upward to be opened and a rotary drum (not shown) moves forward in the mouth portion "b".

For these reasons, according to the related art, the riding of the butting portions of the tape cassette "a" across the receiving portions of the cassette holder "a" at the time of insertion of the tape cassette "a" in the cassette holder "j" cannot be prevented unless the dimensional accuracy of each of the tape cassette "a" and the cassette holder "j" is increased. Further there may occur the above-described accident that cassette loading cannot be performed due to slight dimensional mismatching between the butting portions and the receiving portions.

In particular, such a problem tends to become more serious with the miniaturization of tape cassettes.

SUMMARY OF THE INVENTION

An object of the present invention is to provide a tape cassette and a cassette holderthat are capable of ensuring, when the tape cassette is inserted in the cassette holder, the positioning of the tape cassette with an improved accuracy, and loosening the dimensional accuracy of each of the tape cassette and the cassette holder.

To achieve the above object, according to a first aspect of the present invention, there is provided a tape cassette, which includes a mouth portion provided in a front portion of a cassette shell in such a manner as to be opened forward, upward, and downward, part of a tape-like recording medium being positioned to cross the front end of the mouth portion; and a front lid for covering the front side of the tape-like recording medium, the front lid being opened when the tape cassette is inserted in a cassette holder, and which is loaded in a tape drive apparatus by a manner of inserting the tape cassette in the cassette holder and then moving the cassette holder relative to a chassis of the tape drive apparatus. The tape cassette is characterized by including a plurality of butting portions to be brought into contact with the cassette holder when the tape cassette is inserted in the cassette holder, the butting portions being provided on each of the right and left sides of a front end portion of the cassette shell.

According to a second aspect of the present invention, there is provided a cassette holder for holding a tape cassette inserted therein, which is provided in such a manner as to be movable relative to a chassis of a tape drive apparatus for loading the tape cassette at a specific loading position in the tape drive apparatus. The cassette holder is characterized by including a plurality of receiving portions for receiving the tape cassette in the insertion direction, the plurality of receiving portions being provided on each of the right and left sides of the cassette holder.

With the tape cassette and the cassette holder of the present invention configured as described above, when the tape cassette is inserted in the cassette holder, the front lid is opened, and the positioning of the tape cassette to the cassette holder is performed by contact of the pluralities of butting portions with the pluralities of receiving portions, so that it is possible to prevent the tape cassette from riding across the receiving portions of the cassette holder, and hence to ensure the positioning of the tape cassette to the cassette holder with an improved accuracy. Further, if one of the butting portions fails to be sufficiently brought into contact with the corresponding one of the receiving portions, the positioning of the tape cassette can be attained by the contact of the other butting portions with the other receiving portions. As a result, it is possible to loosen the dimensional accuracy of the butting portions and the receiving portions.

In the tape cassette of the present invention, preferably, the pluralities of butting portions are covered with the front lid in a lid closed state of the front lid. With this configuration, in a state in which the tape cassette is not loaded in the tape drive apparatus, the butting portions are not exposed to the outside of the tape cassette. As a result, since foreign matter does not adhere to the butting portions or the butting portions are not damaged, it is usually possible to perform the positioning of the tape cassette to the cassette holder with a high accuracy, and to ensure a good external appearance of the tape cassette.

DETAILED DESCRIPTION OF THE PREFERRED EMBODIMENT

Hereinafter, preferred embodiments of a tape cassette and a cassette holder according to the present invention will be described with reference to the accompanying drawings.

Referring to FIGS. 1 to 5, a tape cassette according to the present invention will be described first.

Figure 1:
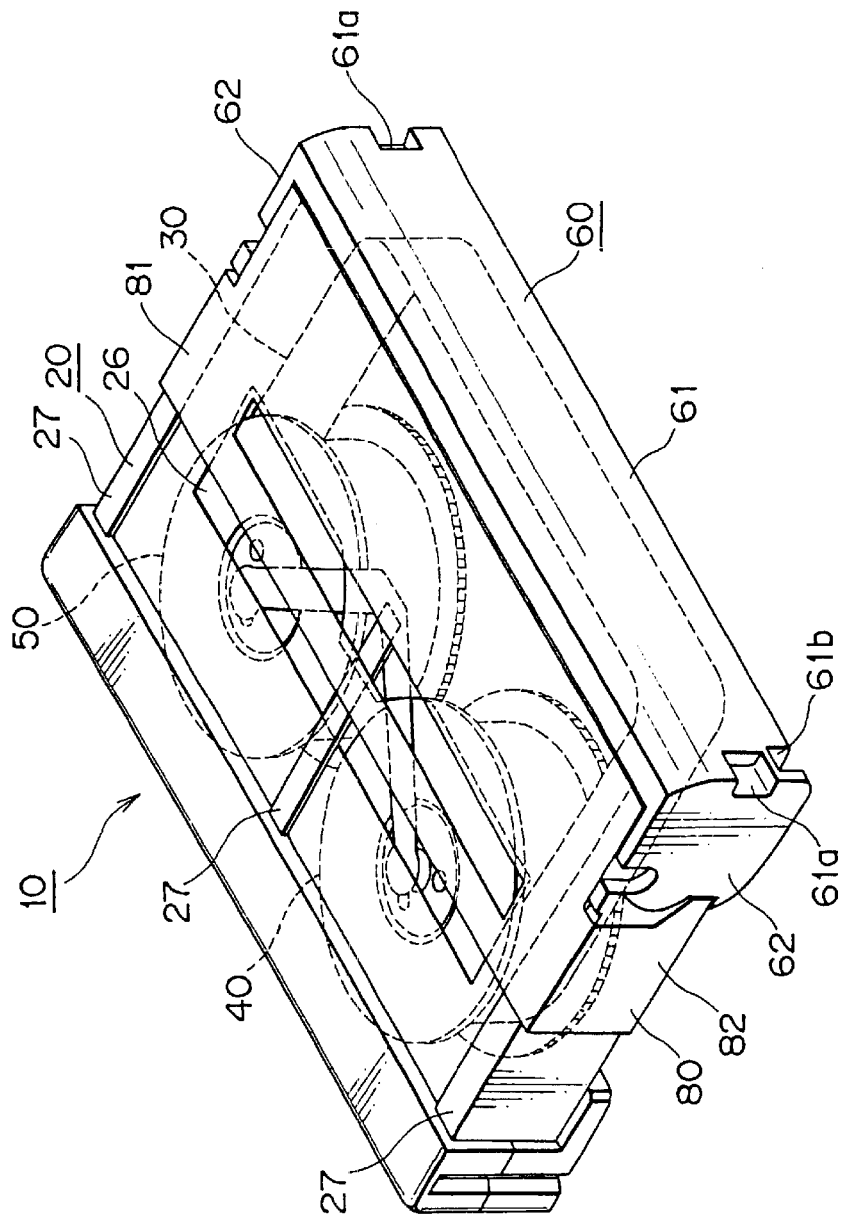
FIG. 1 is a perspective view of an example of a tape cassette used for a tape drive apparatus, which includes a cassette holder of the present invention, showing a state in which lid are located at closed positions.

Referring to FIG. 1, a tape cassette 10 includes a thin-box shaped cassette shell 20 in which tape reels 40 and 50 are rotatably contained. A magnetic tape 30 representative of a tape-like recording medium is wound around the tape reels 40 and 50. The tape cassette 10 also includes a front lid 60 for covering the front surface side of the magnetic tape 30 positioned along the front surface of the cassette shell 20 and a back lid 70 for covering the back surface side of the magnetic tape 30. A slider 80 is supported on the cassette shell 20 in such a manner as to be movable forward and backward. The back lid 70 is formed integrally with the slider 80, and the front lid 60 is turnably supported by the slider 80.

Figure 2:
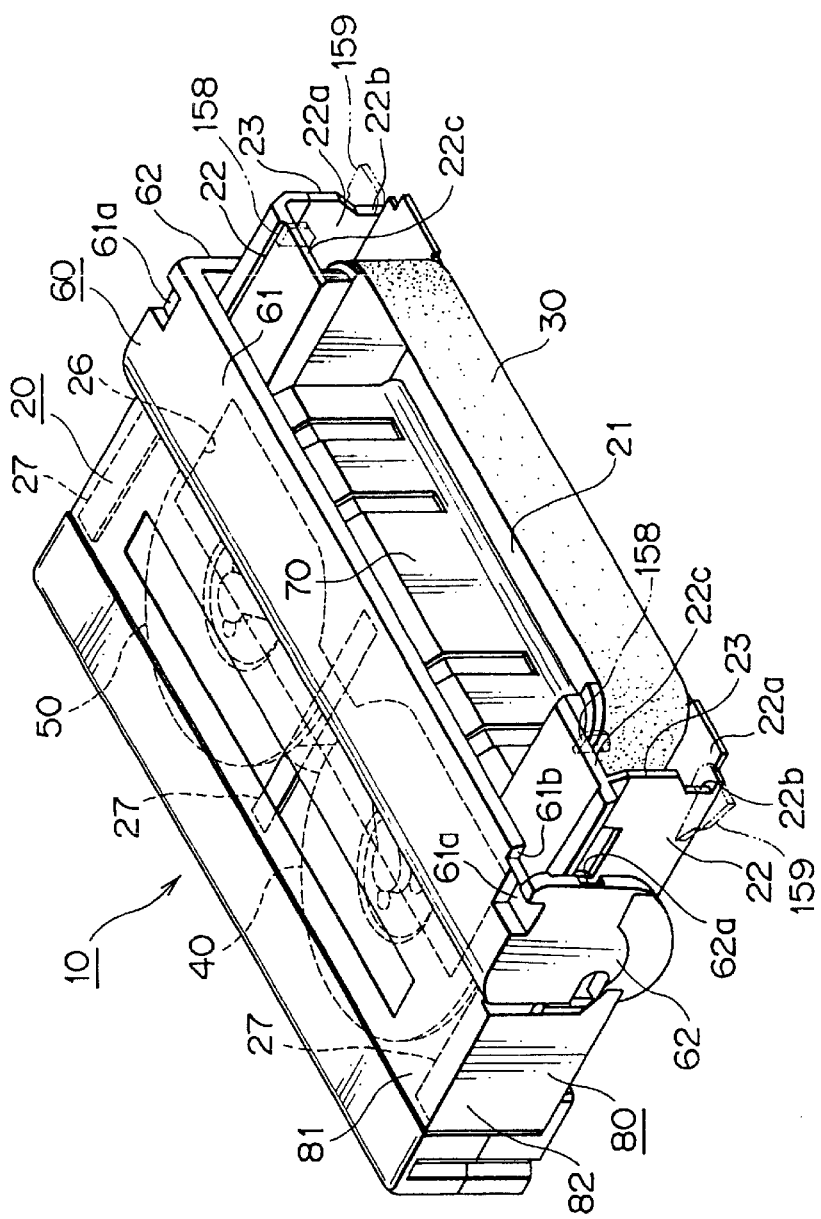
FIG. 2 is a perspective view of the tape cassette, showing a state in which lids are located at opened positions.
Figure 4:
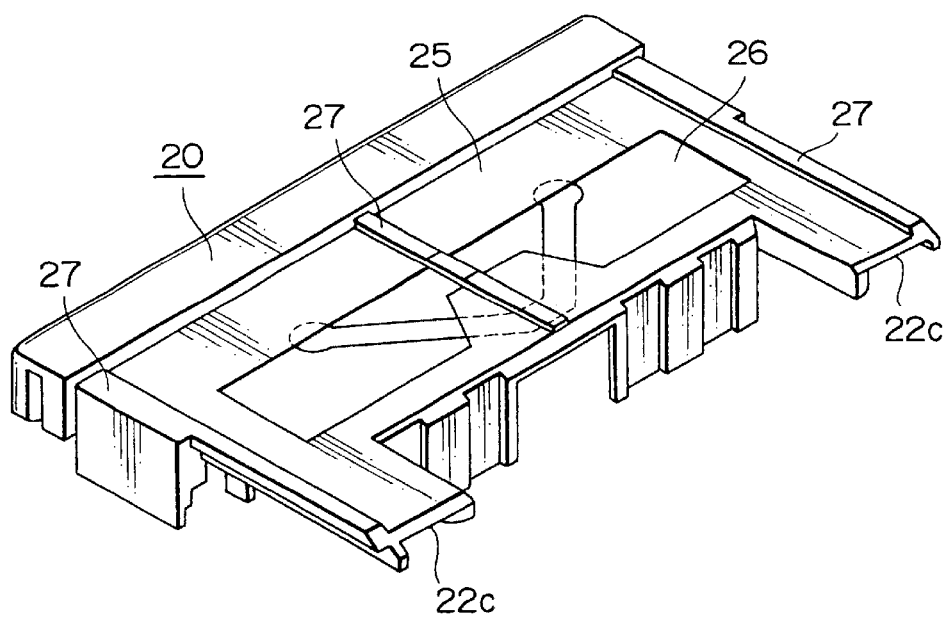
FIG. 4 is a perspective view showing an upper side portion of a cassette shell.

Referring to FIGS. 2 and 4, the thin-box-shaped cassette shell 20 is made from a plastic material. A front portion of the cassette shell 20 has a large recess 21 (hereinafter, referred to as "mouth portion 21"). The mouth portion 21 is opened forward, upward, and downward.

Referring to FIG. 2, a tape extraction portion 22 formed into a lying square cylinder is provided on each of both sides of the mouth portion 21 of the cassette shell 20. A front end 22a of the tape extraction portion 22 is opened. The magnetic tape 30 is extracted outside from the openings 22a of both the tape extraction portions 22 and is stretched between the openings 22a in such a manner as to cross the front surface of the mouth portion 21.

Each tape extraction portion 22 has, at a nearly upper half of the outer side front end surface, a cam portion 23 formed into a circular-arc surface shape projecting forward. The tape extraction portion 22 also has, at a nearly lower half 22b of the outer side front end surface and an upper side front end surface 22c, butting portions for positioning, when the tape cassette is inserted in a cassette holder, the tape cassette to the cassette holder in the insertion direction (more fully described later). In addition, the butting portion located at the lower half of the outer side front end surface is taken as a side butting portion 22b, and the butting portion located at the upper side front end surface is taken as an upper butting portion 22c.

When the front lid 60 covers the tape extraction portions 22 and the mouth portion 21, the side butting portions 22b and the upper butting portions 22c are located inside the front lid 60. In other words, in the closed state of the front lid 60, the butting portions 22b and 22c are not exposed to the outside of the tape cassette, thereby eliminating the occurrence of foreign matters adhering on the butting portions 22b and 22c and the butting portions 22b and 22c being damaged. As a result, it is possible to perform accurate positioning of the tape cassette to the cassette holder by the contact of the butting portions 22b and 22c with the corresponding members of the cassette holder.

In the case of the above-described related art tape cassette designed such that the butting portions are exposed, foreign matter may adhere on the butting portions or the butting portions may be deformed by falling. If such a tape cassette is inserted in a cassette holder, the positioning of the tape cassette to the cassette holder in the insertion direction cannot be accurately performed because of inaccurate contact of the butting portions with the corresponding members of the cassette holder, and accordingly, the tape cassette may not be loaded often in a tape drive apparatus. Such a problem has become serious with the tendency toward miniaturization of tape cassettes and tape drive apparatuses. According to this embodiment, this problem can be solved by the configuration that the butting portions 22b and 22c are covered with the front lid 60.

Figure 3:
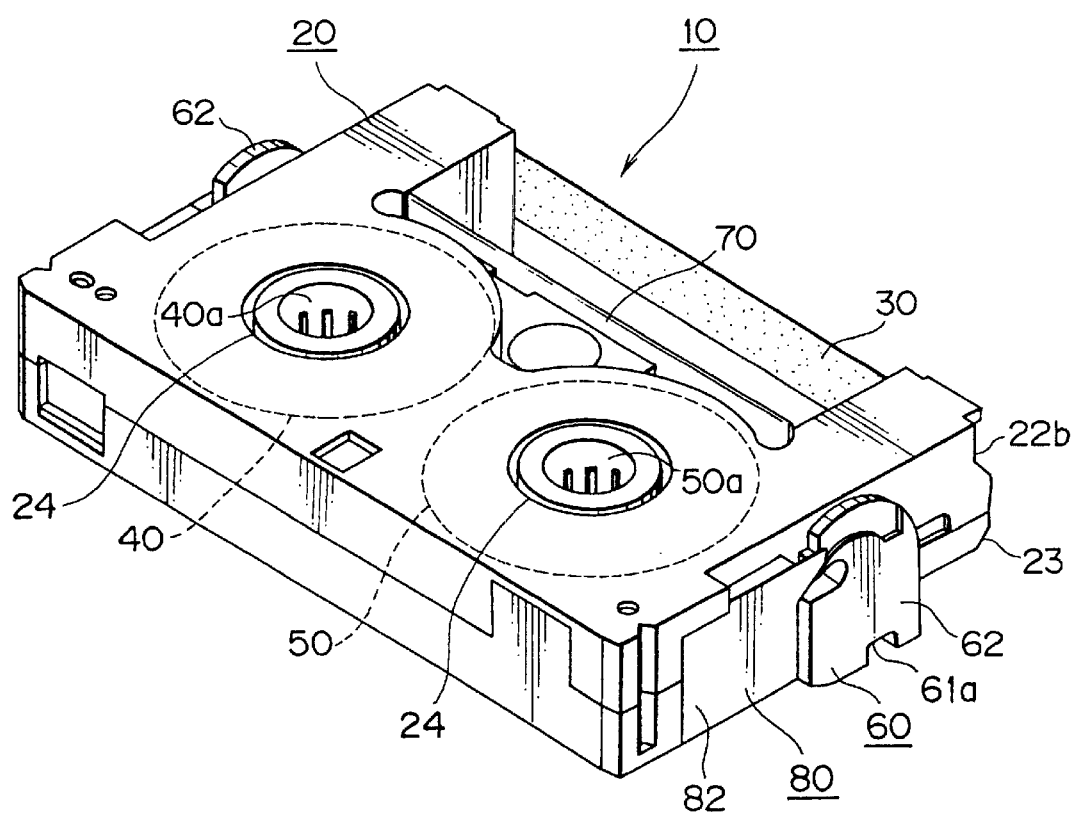
FIG. 3 is a perspective view, seen from below, of the tape cassette, showing a state in which the lids are located at the opened positions.

Referring to FIG. 3, the bottom plate of the cassette shell 20 has two reel base through-holes 24. When the tape cassette 10 is loaded in the tape drive apparatus, two reel bases provided on the tape drive apparatus are inserted in the cassette shell 20 while passing through the reel base through-holes 24, and engagement shafts provided on the reel bases are engaged in reel base engagement holes 40a and 50a opened in the bottom surfaces of the tape reels 40 and 50.

An upper surface portion 25 of the cassette shell 20 has, at a position slightly offset forward from the center in the direction from front to rear, a window 26 longer from side to side (see FIG. 1). The window 26 is adapted to check the winding state of the magnetic tape 30 wound around the tape reels 40 and 50 in the cassette shell 20. In this embodiment, the window 26 is formed of a transparent plastic; however, a window 26 prepared separately may be fitted in the corresponding portion of the cassette shell 20, or a window 26 may be formed integrally with the cassette shell 20 by a so-called two-color molding (see FIG. 4).

Three projecting ribs 27 are formed on right and left side portions and a central portion of the upper surface portion 25 in such a manner as to slightly project upward from the upper surface portion 25. The right and left projecting ribs 27 are apart from the window 26, whereas the central projecting rib 27 crosses the window 26 (see FIG. 4). The slider 80 is slidably moved on the projecting ribs 27.

Additionally, three pieces of the projecting ribs 27 are provided in this embodiment; however, the present invention is not limited. For example, only the right and left projecting ribs 27 may be provided. Further, the cross-sectional shape of the projecting rib 27 may be a square shape or a round shape. That is to say, the projecting rib 27 may be formed into any shape in cross-section insofar as it slightly projects upward from the upper surface portion 25. Further, the projecting rib 27 may be replaced with at least two or more projections spaced from each other at suitable intervals. In summary, the projecting rib 27 or its equivalent may be formed such that the slider 80 slides thereon with a suitable gap kept between the slider 80 and the upper surface portion 25, particularly, the window 26 of the cassette shell 20.

Figure 5:
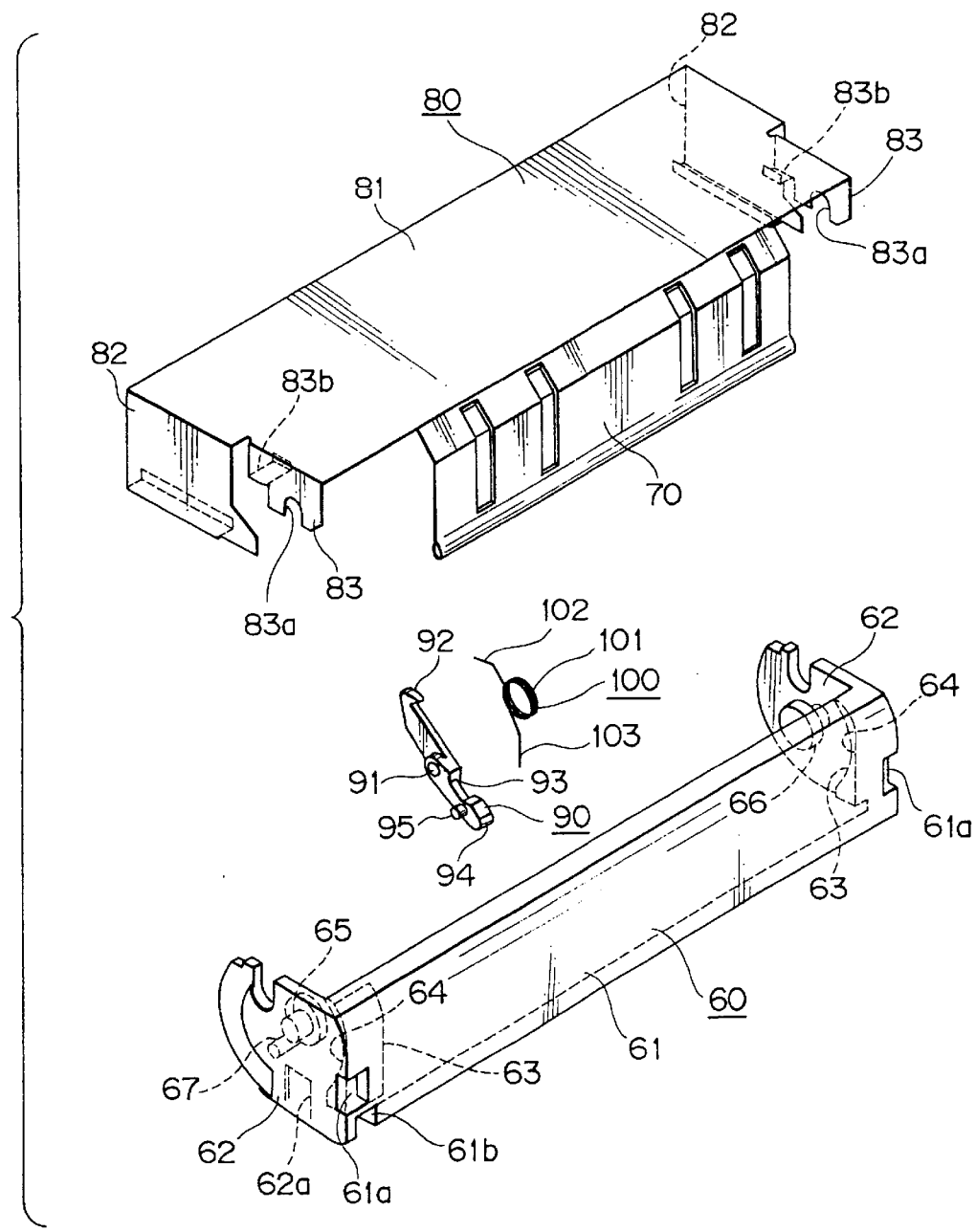
FIG. 5 is an exploded perspective view of a slider unit.

The slider 80 is formed of a plate made from a high conductivity material having a relatively high hardness, for example, a stainless steel plate. Referring to FIG. 5, the slider 80 is a one-body which has an upper surface portion 81 formed into a plate-shape longer from side to side, and side surface portions formed integrally with the right and left side edges of the upper surface portion 81 in such a manner as to project downward therefrom. Each side surface portion includes a principal surface portion 82 extending from a portion, slightly offset forward from the center in the direction from front to rear, to the rear end, and a lid supporting portion 83 positioned in front of the principal surface portion 82.

The lid supporting portion 83 is positioned slightly inside the principal surface portion 82. The width in the vertical direction of the lid supporting portion 83 is nearly half that of the principal surface portion 82. The lid supporting portion 83 has an approximately semi-circular shaft holding portion 83a opened downward. The back lid 70 is bent from the front edge of the upper surface portion 81 in such a manner as to extend downward therefrom at a right angle (see FIG. 5).

In a state in which both the front lid 60 and the back lid 70 are closed (the state shown in FIG. 1), as described above, the magnetic tape 30 is present in a space formed between both the lids 60 and 70 in such a manner as not to be brought into contact therewith but to be in proximity thereto. Also since the back lid 70 is formed integrally with the slider 80 by the high conductivity stainless steel plate, the back lid 70 is less electrically charged and, therefore, it does not attract the magnetic tape 30 by electrostatic charges. As a result, there does not occur the so-called tape jamming at the time of cassette loading or tape loading. Further, as will be described later, since the slider 80 is pressed down by a cassette pressing spring made from a high conductivity material, electric charges can be effectively grounded from the back lid 70 positioned in the vicinity of the magnetic tape 30 to a main chassis of the tape drive apparatus.

Referring to FIG. 5, the front lid 60 is a one-body which has a front surface portion 61 formed into a stripe-shape longer nearly from side to side, and two side surface portions 62 formed integrally with the right and left edges of the front surface portion 61 in such a manner as to project rearward therefrom. An upper end portion of the front surface portion 61 is gently curved to be displaced rearward as nearing the upper end.

Referring to FIG. 5, a thick wall portion 63 is formed on an inner surface portion, joined to the front surface portion 61, of each side surface portion 62. The thick portion 63 has a restriction surface 64 formed into a circular-arc shape in a side view. Pivots 65 and 66 project from approximately central portions, facing to the restriction surfaces 64, of the inner surfaces of the left and right side surface portions 62. That is to say, the restriction surfaces 64 are formed into the circular arc-shapes centered at the pivots 65 and 66.

A lower end portion of the inner surface of the left side surface portion 62 has a recess 62a opened downward (see FIG. 5).

A supporting shaft 67 projects from a portion, offset rearward, downward from the pivot 65, of the inner surface of the left side surface portion 62 (see FIG. 5).

A portion, near the lower end, of each of both ends of the front surface portion 61 has an engagement recess 61a opened forward, sideward, and a portion, near the left end, of the lower edge of the front surface portion 61 has a through-cutout 61b (see FIG. 5).

Figure 12:
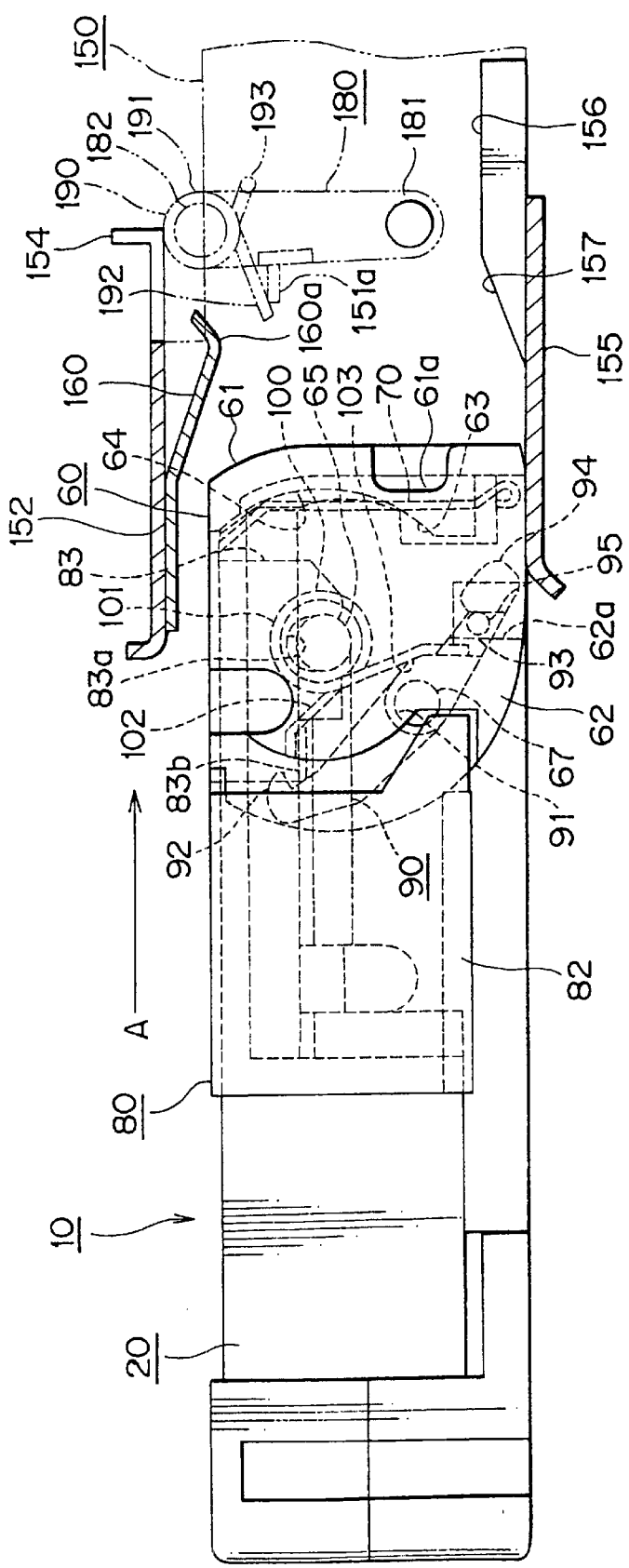
FIG. 12 is a schematic left side view, with part partiallycut away, illustrating one step of a process of insertion and removal of the tape cassette in and from the tape drive apparatus, in which the tape cassette has started to be inserted in the cassette holder.

The pivots 65 and 66 of the side surface portions 62 of the front lid 60 are turnably engaged in the shaft holding portions 83a of the slider 80, whereby the front lid 60 is turnably supported by the lid supporting portions 83 at the front end portion of the slider 80 (see FIG. 12).

Referring to FIG. 12, a lid lock member 90 is mounted to the inner side of the left side surface portion 62 of the front lid 60. The lid lock member 90 is elongated as a whole, and has at its central portion a supporting hole 91. The supporting shaft 67 formed on the left side surface portion 62 of the front lid 60 is inserted in the supporting hole 91, whereby the lid lock member 90 is turnably supported on the inner surface side of the side surface portion 62.

Referring to FIG. 12, a lock claw 92 is formed on an upper end portion of the lid lock member 90. When the lid lock member 90 is in such a posture as to be tilted rightward, downward as seen from the left side, the lock claw 92 projects nearly forward to lock, from rear, the upper surface of a sliding projection 83b formed on the left lid supporting portion 83 of the slider 80. The lid lock member 90 has a spring catch surface 93. The spring catch surface 93 is formed by cutting out a surface portion which is located on the side opposed to the side facing to the side surface portion 62 at a position between the supporting hole 91 and the lower end of the lid lock member 90. A front portion 94 of the lower end surface of the lid lock member 90 is taken as a circular-arc surface. The lid lock member 90 also has a lock pin 95 projecting from a portion which is located on the left side facing to the left side surface portion 62 of the front lid 60 at a position near the lower end. When the lid lock member 90 is mounted to the inner side of the left side surface portion 62 of the front lid 60, as shown in FIG. 12, the lock pin 95 is positioned in the recess 62a formed in the left side surface portion 62 of the front lid 60.

A torsion coil spring 100 is provided on the lid lock member 90 so as to bias both the front lid 60 and the lid lock member 90 in specific directions (see FIGS. 5 and 12).

The torsion coil spring 100 has a coil portion 101, and two arm pieces 102 and 103. The coil portion 101 is fitted around the pivot 65 formed on the left side surface portion 62 of the front lid 60. The arm piece 102 is brought into elastic contact, from front, with the upper surface of the sliding projection 83b formed on the left lid supporting portion 83 of the slider 80, and the arm piece 103 is brought into elastic contact with the spring catch surface 93 of the lid lock member 90 (see FIG. 12). Accordingly, the lid lock member 90 is biased clockwise as seen from the left side, and the front lid 60 is biased, via the lid lock member 90 and the supporting shaft 67, clockwise as seen from the left side, that is, in the direction in which the front surface portion 61 of the front lid 60 closes the front side of the mouth portion 21 (see FIG. 12).

In this way, the lid lock member 90 locks the opening of the front lid 60, and further, presses the front lid 60 and the slider 80 by the force of the torsion coil spring 100, thereby absorbing the looseness between the front lid 60 and the slider 80.

Figure 6:
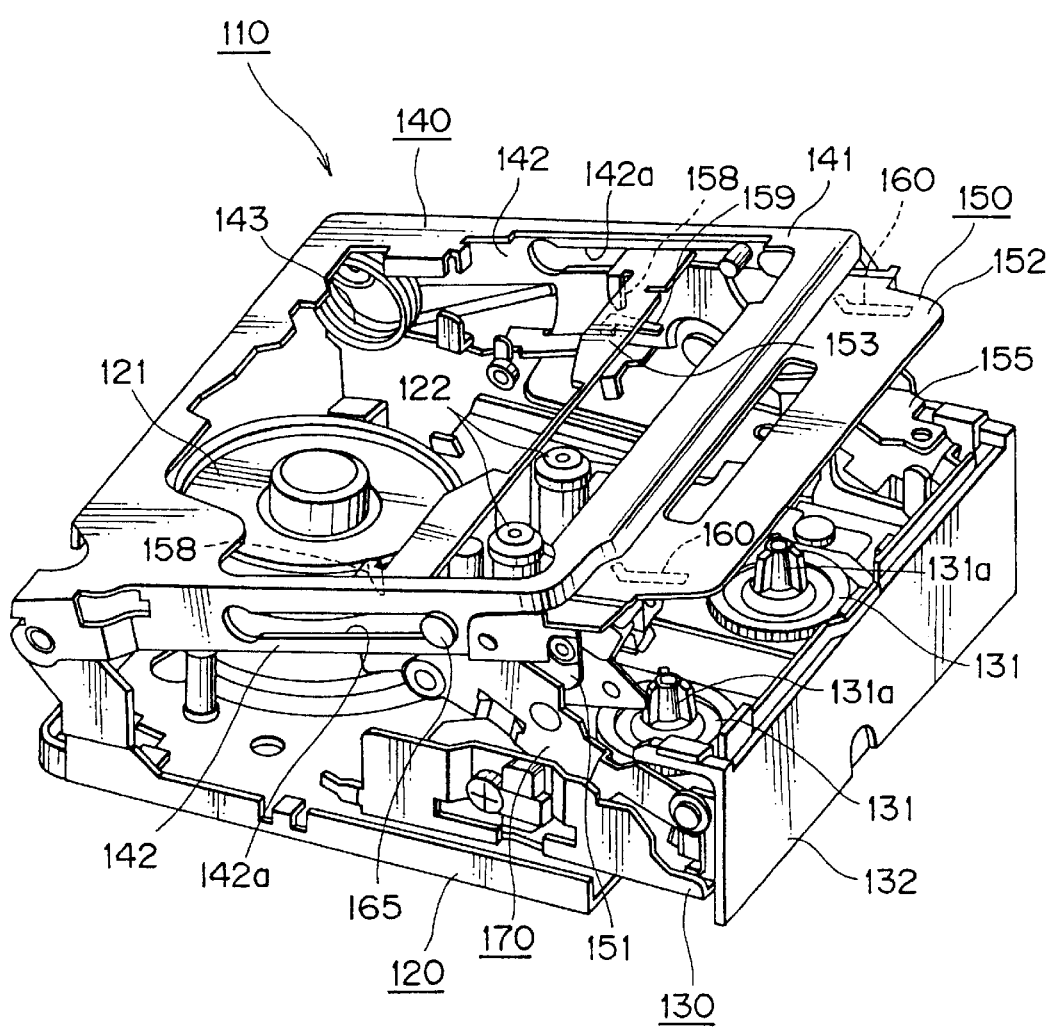
FIG. 6 is a schematic perspective view of a tape drive apparatus including a cassette holder of the present invention, showing a state in which the cassette holder is located at an eject position.

A tape drive apparatus 110 includes a main chassis 120, a slide chassis 130, a movable frame 140, and a cassette holder 150 (see FIG. 6).

Referring to FIG. 6, the main chassis 120 has principal mechanisms for extracting the magnetic tape 30 from the cassette shell 20, forming a specific tape path, and running the magnetic tape 30, for example, two tape extraction guides 122, a pinch roller (not shown), and the like. As will be described later, the tape extraction guides 122, the pinch roller, and the like are rotatably supported on supporting boards (not shown), and the supporting boards are movably supported on the main chassis 120.

Referring to FIG. 6, the slide chassis 130 is positioned in front of the main chassis 120, and is supported on the main chassis 120 in such a manner as to be movable forward or rearward. The tape cassette 10 is to be loaded in the slide chassis 130. Two reel bases 131 to be engaged with the tape reels 40 and 50 for rotation, and the like are provided on the slide chassis 130.

With respect to the front and rear sides of the tape drive apparatus 110, as described above, the inlet side on which the tape cassette 10 is started to be inserted is taken as the front side, and the depth side is taken as the rear side. Accordingly, when the tape cassette 10 is loaded in the tape drive apparatus 110, the front/rear side of the tape cassette has an inverse relationship with the front/rear side of the tape drive apparatus 110. That is to say, when the tape cassette 10 is loaded in the tape drive apparatus 110, the front side of the tape cassette 10 is located on the rear side (depth side) of the tape drive apparatus 110 and the rear side of the tape cassette 10 is located on the front side (inlet side) of the tape drive apparatus 110.

Referring to FIG. 6; the movable frame 140 includes an upper surface portion 141 formed into an approximately square-shape, and side surface plates 142 projecting downward from right and left side edges of the upper surface portion 141. Rear end portions of the side surface portions 142 are turnably supported on a rear end portion of the main chassis 120. The movable frame 140 is biased upwardly by a torsion coil spring 143. Each side surface portion 142 has a guide slit 142a extending from front to rear.

Figure 7:
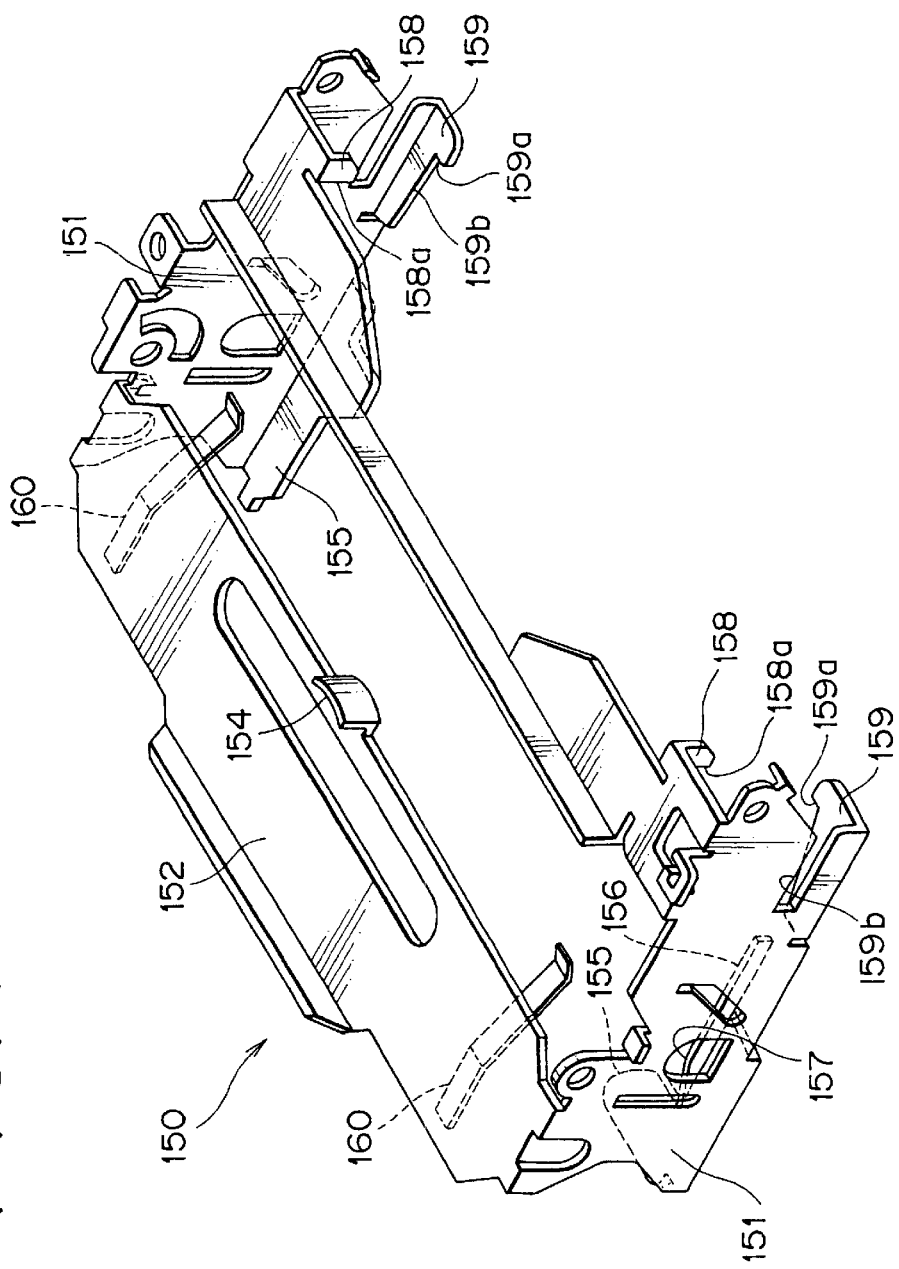
FIG. 7 is a perspective view of the cassette holder.

Referring to FIG. 7, the cassette holder 150 includes two side surface plates 151. Nearly front half portions of the upper ends of the side surface plates 151 are connected to each other by a front side upper surface plate 152, and rear end portions of the side surface plates 151 are connected to each other by a rear end upper surface plate 153. The cassette holder 150 is formed of a plate made from a high conductivity material (good conductor), for example, a steel plate.

Figure 13:
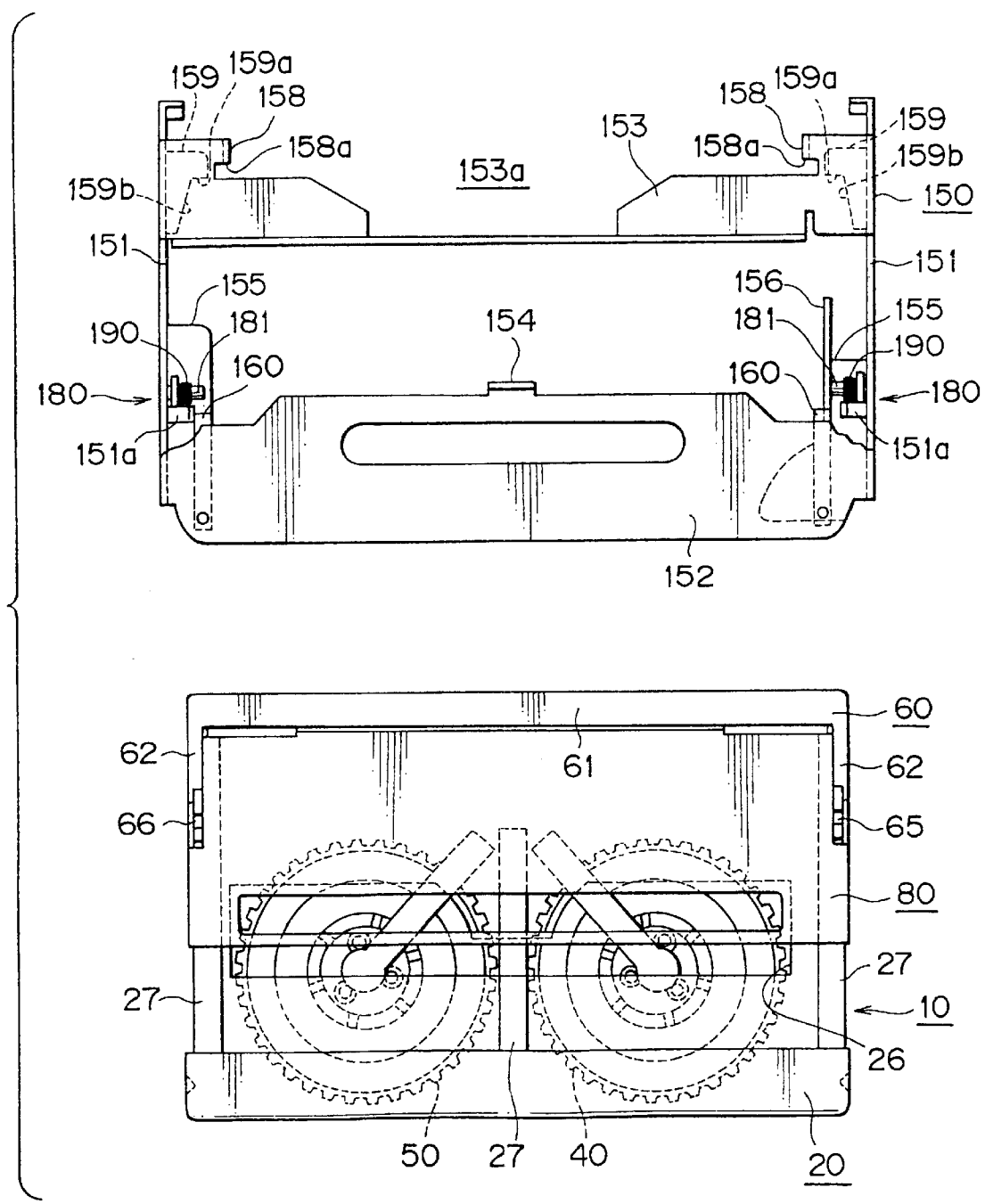
FIG. 13 is a schematic plan view illustrating a state before the tape cassette is inserted in the cassette holder.

Referring to FIG. 13, a lid pressing piece 154 projecting upward is formed at a central portion of the rear edge of the front side upper plate 152. Two receiving plates 155 project inwardly from the front halves of lower edges of the side surface plates 151 in such a manner as to come close to each other. These receiving plates 155 extend from an approximately central portion in the direction from front to rear to the front side of the cassette holder 150, and, accordingly, the receiving plates 155 are not present at the depth portion (rear end portion) of the cassette holder 150.

A lock releasing cam 156 is formed at the inner edge of the left receiving plate 155 by partially cutting a line which surrounds a portion forming the cam 156, and bending the portion upward. The lock releasing cam 156 is provided at a position corresponding to a position at which a lid opener (which will be described later) is disposed. The edge, on the side on which the tape cassette 10 is inserted, that is, the upper edge of a front end portion of the lock releasing cam 156 is tilted downward as nearing the front end, to form a tilt edge 157 (see FIG. 12). The width in the direction from side to side of the lock releasing cam 156, which is formed by bending a portion of the plate forming the receiving plate 155, that is, the thickness of the plate forming the lock releasing cam 156 is set to be smaller than the width of the through-cutout 61b formed in the front surface portion 61 of the front lid 60.

A central portion of the rear edge of the rear end upper surface plate 153 has an opening portion 153a opened rearward. Two upper receiving pieces 158 are provided at the inner edges, opposed to each other, of a rear end portion of the opening portions 153a. To be more specific, each upper receiving piece 158 is formed by partially cutting a line which surrounds a portion forming the upper receiving piece 158 and bending the portion downward. The upper receiving pieces 158 have front edges 158a (hereinafter, referred to as "upper receiving portions"). The upper receiving portions 158a are located at positions which correspond to the above-described butting portions 22c of the tape cassette 10 in a state in which the front lid 60 is opened to expose the openings 22a of the tape extraction portions 22.

The rear end portion of each side surface plate 151 has, at a position higher than that of the receiving plate 155, a side receiving piece 159 that is bent inward (see FIG. 7).

The side receiving piece 159 has, at a rear end portion, a side receiving portion 159a that is directed forward. The side receiving piece 159 also has a tilt edge (hereinafter, referred to as "lead-in edge") 159b extending forward, outward from the side receiving portion 159a. The side receiving portions 159a are located at positions corresponding to those of the side butting portions 22b of the tape extraction portions 22 of the tape cassette 10.

As described, when the tape cassette 10 is inserted in the cassette holder 150, the butting portions 22b and 22c are brought into contact with the above-described receiving portions 158a and 159a, thereby to perform the positioning of the tape cassette 10 in the insertion direction (see FIG. 13).

Referring to FIG. 13, two cassette pressing springs 160 are mounted on the right and left ends of a front-end portion of the front side upper surface portion 152 in such a manner as to extend rearward, obliquely downward. The cassette pressing springs 160 are adapted for pressing downward the tape cassette 10 inserted in the cassette holder 150. Each cassette pressing spring 160 is formed of a plate made from a spring material having a high conductivity.

The cassette pressing springs 160 are located at positions corresponding to those of the projecting ribs 27 formed at the right and left ends of the upper surface portion 25 of the tape cassette 10 inserted in the cassette holder 150 (see FIG. 13).

With this configuration, when the tape cassette 10 is inserted in the cassette holder 150, the cassette pressing springs 160 are slid relative to the upper surface of the slider 80, and, accordingly, the cassette pressing springs 160 press the right and left projecting ribs 27 via the slider 80, whereby the gap between the slider 80 and the upper surface portion 25 of the cassette shell 20 can be kept.

Since the slider 80 of the tape cassette 10 is formed of a stainless steel plate having a high conductivity as described above and also the cassette pressing springs 160 made from a good conductor are brought into contact with the slider 80, electric charges of the cassette shell 20 can be effectively eliminated, that is, effectively grounded to the main chassis 120 via the cassette pressing springs 160 and the cassette holder 150. Accordingly, it is possible to prevent the tape cassette 10 from being electrically charged, and hence to eliminate, at the time of cassette loading or tape loading, the inconvenience that the magnetic tape 30 is stuck on the front lid 60 or the back lid 70 and thereby prevent the occurrence of tape jamming.

Contact portions 160a, to be brought into contact with the tape cassette 10, of the cassette pressing springs 160 correspond to the receiving plates 155 in the direction from front to rear, that is, in the insertion direction of the tape cassette 10, and accordingly, when the tape cassette 10 is inserted in the cassette holder 150, it is held between the cassette pressing springs 160 and the receiving plates 155 (see FIG. 17) With this configuration, it is possible to stably hold the tape cassette 10 at the depth portion (rear end portion) of the cassette holder 150 without provision of any special holding member.

The cassette holder 150 is supported on the movable frame 140 in such a manner as to be movable forward and rearward. In addition, two sliding pins 165 as part of members for supporting the cassette holder 150 on the movable frame 140 project from the side surface plates 151 of the cassette holder 150. The sliding pins 165 are slidably fitted in the guide slits 142a of the movable frame 140 (see FIG. 6).

Two turning links 170 are provided for connecting the cassette holder 150 to the slide chassis 130. One-ends of the turning links 170 are turnably connected to portions, projecting from the lower edges of the side surface portions 142 of the movable frame 140, of the side surface plates 151 of the cassette holder 150. The other ends of the turning links 170 are turnably supported by a front surface plate 132 mounted on a front end portion of the slide chassis 130.

Two lid openers 180 as means for moving the front lid 60 and the back lid 70 to lid opening positions are provided on the cassette holder 150.

Each of the lid openers 180 is formed into a long arm shape. An upper end portion of the lid opener 180 is turnably supported on an upper end portion of the inner surface of each side surface plate 151 of the cassette holder 150. An engagement projection 181 projects from the inner surface of a turning end portion of the lid opener 180. A torsion coil spring 190 having a coil portion 191 and arms 192 and 193 is provided on each lid opener 180. The coil portion 191 is fitted around a turning shaft 182 of the lid opener 180. The arm 192 is brought into contact, from above, with a spring catch piece 151a formed on each side surface plate 151 of the cassette holder 150. To be more specific, the arm 192 is formed by partially cutting a line which surrounds a portion forming the arm 192, and raising the portion inward. The arm 193 is brought into contact with a portion, near a turning fulcrum, of the front edge of the lid opener 180. As a result, each lid opener 180 is biased by the torsion coil spring 190 clockwise as seen from the left side in FIG. 12. Since the arm 192 located near the upper end of the lid opener 180 is in contact with the spring catch piece 151a, the lid opener 180 is held in an upright posture in which the turning end is located at the lower end.

The loading of the tape cassette 10 in the tape drive apparatus 110 will be described below.

First, in a state in which the slide chassis 130 is located at an extraction position, the movable frame 140 is turned upward to move the cassette holder 150 to an eject position shown in FIG. 6. In such a state, the tape cassette 10 is inserted into the cassette holder 150 in the direction A in FIG. 12 with the front lid 60 side directed forward. Along with the insertion of the tape cassette 10, the lock releasing cam 156 is relatively inserted in the front lid 60 through the through-cutout 61b formed in the front side surface 61 of the front lid 60 (see FIG. 12).

At the same time, the cassette pressing springs 160 are, in the cassette holder 150, relatively pressed by the front end, that is, the front lid 60 of the tape cassette 10 to be deflected upward, to ride on the upper surface portion 25 of the cassette shell 20, whereby the cassette pressing springs 160 press the tape cassette 10 downward. The tape cassette 10 is thus held between the cassette pressing springs 160 and the receiving plates 155.

In this case, since the contact portions 160a of the cassette pressing springs 160 are in contact with the slider 80 of the tape cassette 10, it is possible to ground electric charges of the tape cassette 10 to the main chassis 120 via the cassette holder 150, the movable frame 140, and the slide chassis 130, and hence to prevent the tape cassette 10 from being electrically charged.

The engagement projections 181 of the lid openers 180 are engaged in the engagement recesses 61a of the front lid 60. Further, the circular-arc surface 94 at the lower end of the lid lock member 90 slides up on the tilt edge 157 of the lock releasing cam 156, whereby the lid lock member 90 is turned counterclockwise in FIG. 14 to release the engagement of the lock claw 92 with the sliding projection 83b of the slider 80. As a result, the locking of the front lid 60 at the closing position is released (see FIG. 14).

Figure 14:
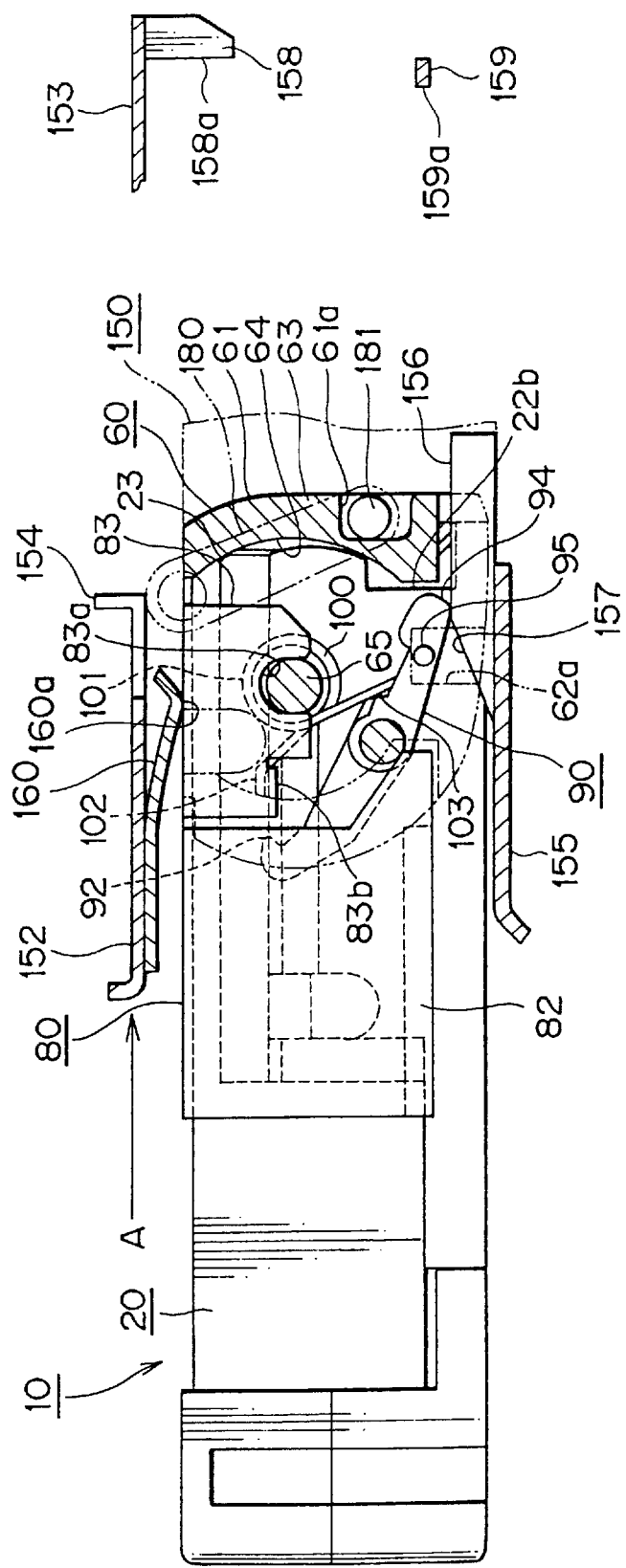
FIG. 14 is a schematic left side view, with parts partiallycut away, illustrating another step of the process of insertion and removal of the tape cassette in and from the tape drive apparatus, in which the locking of the front lid by a lid lock member is released.

As the tape cassette 10 is further inserted in the cassette holder 150, that is, further moved in the direction A in FIG. 14, the engagement projections 181 provided at the turning ends of the lid openers 180 are pressed in the direction A, with a result that the lid openers 180 are turned counterclockwise, that is, in the direction B in FIG. 13. Since the engagement projections 181 of the lid openers 180 are engaged in the engagement recesses 61a of the front lid 60, the front lid 60 is turned counterclockwise, that is, in the direction B along with the upward movement of the engagement projections 181 of the lid openers 180 (see FIG. 15).

Figure 15:
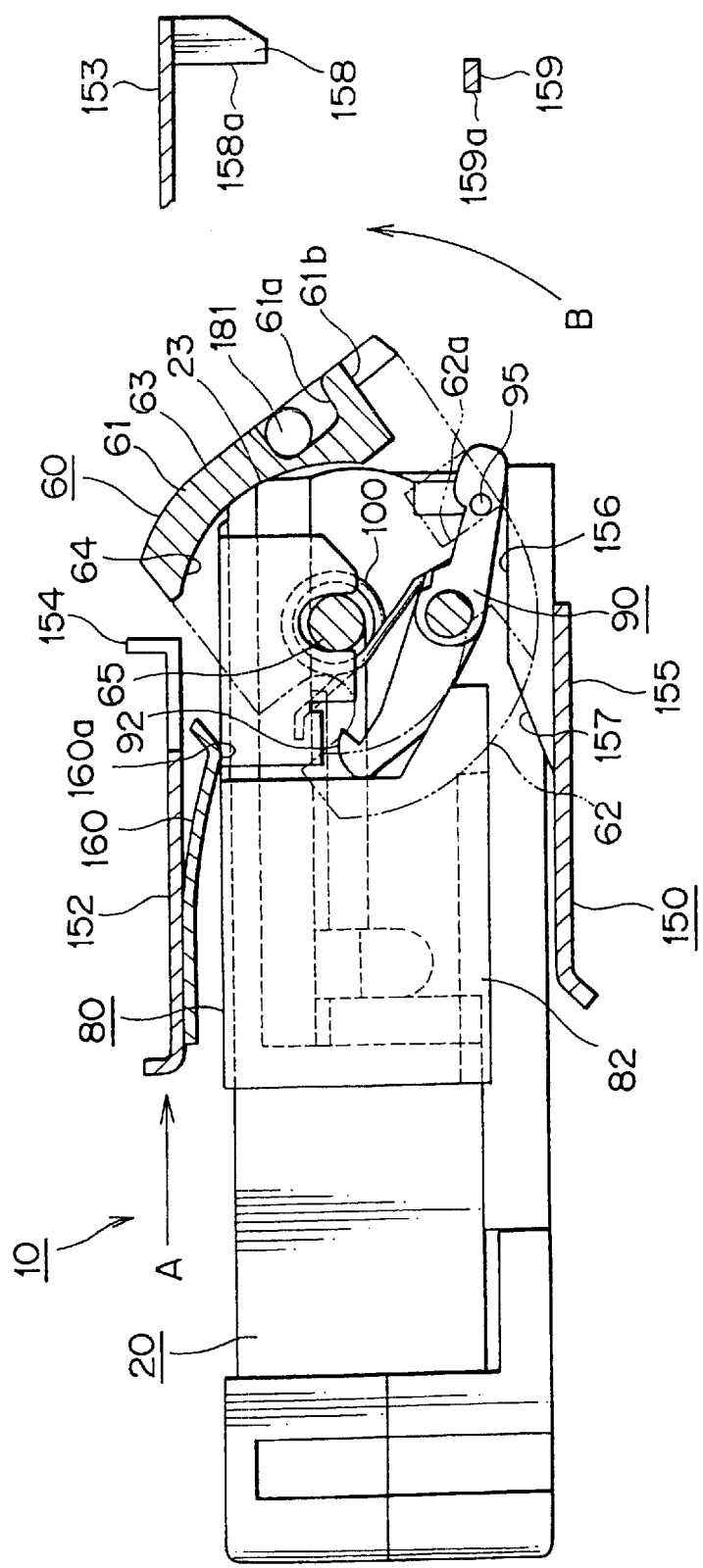
FIG. 15 is a schematic left side view, with parts partially cut away, illustrating a state subsequent to the state shown in FIG. 14.

In addition, the slider 80 receives, via the front lid 60, a force for moving the slider 80 rearward relative to the cassette shell 20 by the engagement projections 181 of the lid openers 180; however, since the restriction surfaces 64 of the front lid 60 are in contact with the cam portions 23 of the cassette shell 20, the slider 80 cannot be moved rearward relative to the cassette shell 20 and thereby only the front lid 60 is turned upward (see FIGS. 14 and 15).

In each of the states shown in FIGS. 14 and 15, the lock pin 95 of the lid lock member 90 is in contact with the rear side inner side surface of the recess 62a formed in the left side surface portion 62 of the front lid 60, and as the front lid 60 is further turned from such a state in the direction B, the lock pin 95 is drawn in the direction B by the rear side inner surface of the recess 62a, whereby the lid lock member 90 is also turned in the direction B.

When the front lid 60 is turned, from the initial state (lid opening state shown in FIG. 123, at about 90° in the direction B, the engagement between the restriction surfaces 64 of the front lid 60 and the cam portions 23 of the cassette shell 20 is released (see FIG. 16), whereby the slider 80 becomes movable rearward relative to the cassette shell 20, to open the front lid 60. Further, in the state shown in FIG. 16, the lid pressing piece 154 formed on the front side upper surface plate 152 of the cassette holder 150 is close, from rear, to the upper end of the front surface portion 61 of the front lid 60.

Figure 16:
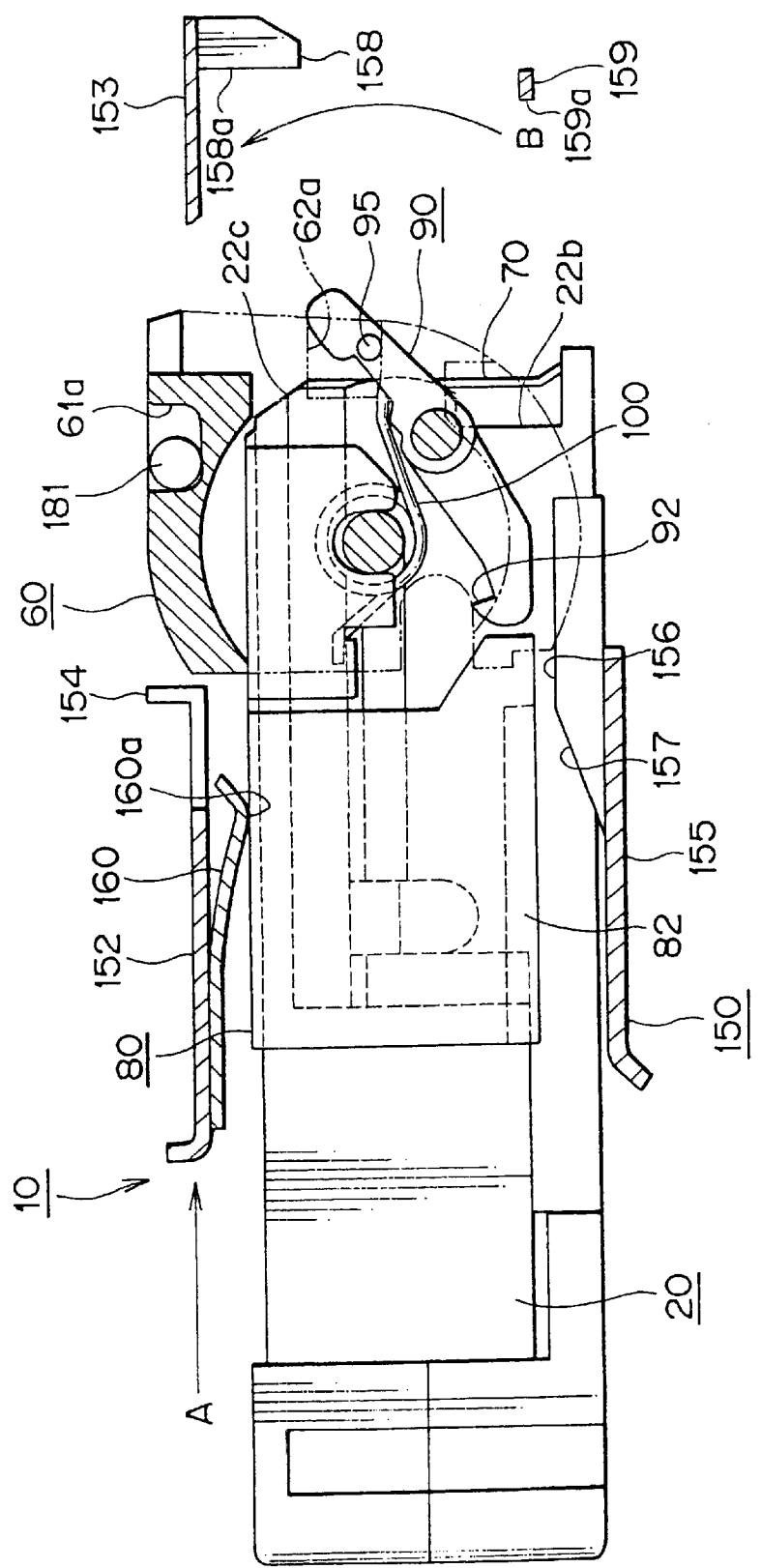
FIG. 16 is a schematic left side view, with parts partiallycut away, illustrating a further step of the process of insertion and removal of the tape cassette in and from the tape drive apparatus, in which the front lid reaches the lid opening position.
Figure 17:
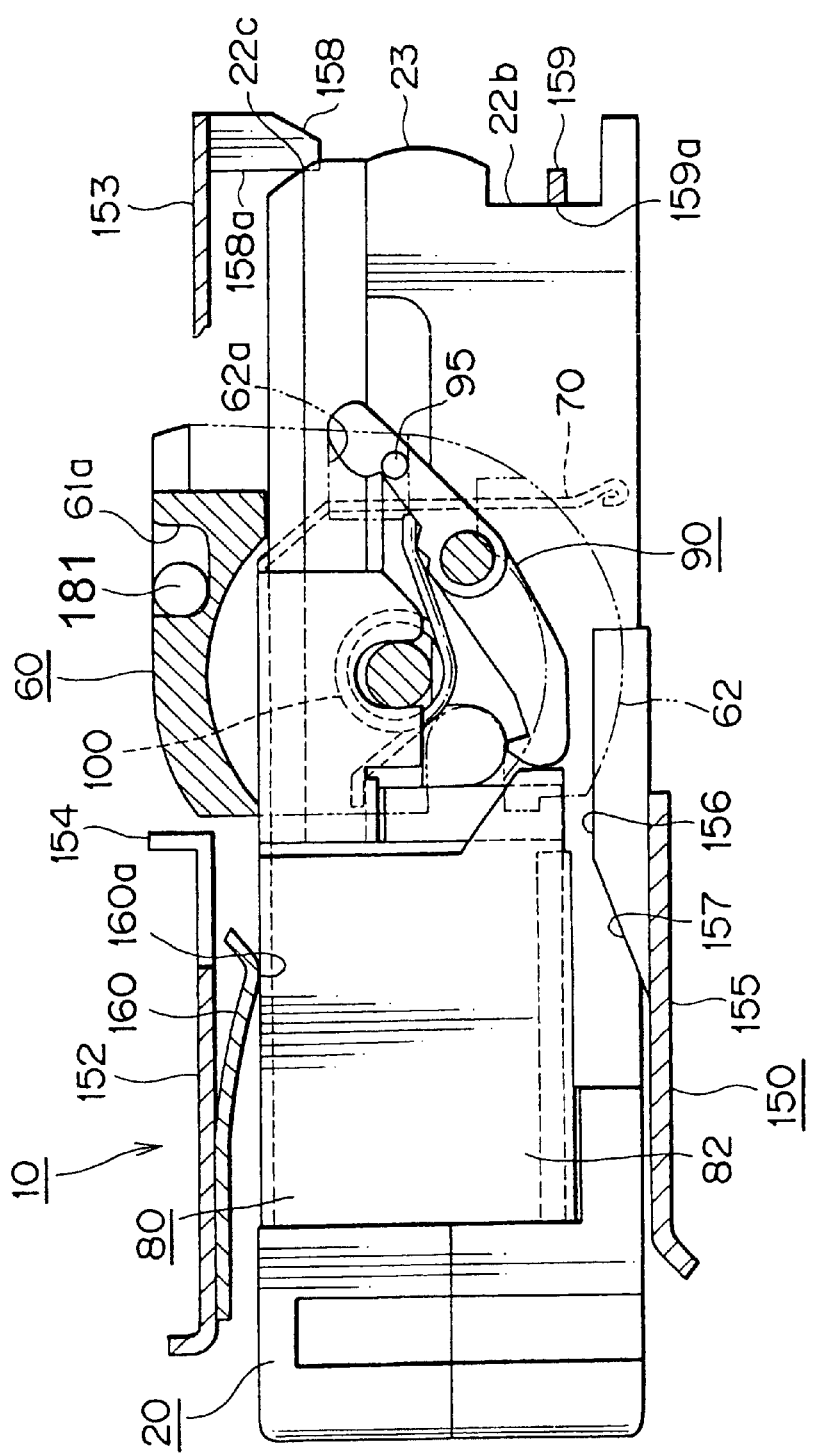
FIG. 17 is a schematic left side view, with parts partiallycut away, illustrating a further step of the process of insertion and removal of the tape cassette in and from the tape drive apparatus, in which the slider is retreated in the state that butting portions come in contact with receiving portions and both the front lid and back lid reach the lid opening positions.

As the tape cassette 10 is further moved, from the state shown in FIG. 16, to the depth of the cassette holder 150, that is, in the direction A, since the engagement projections 181 of the lid openers 180 are engaged in the engagement recesses 61a of the front lid 60, the front lid 60 and the slider 80 on which the front lid 60 is supported cannot be moved in the direction A and are left as they are, with the result that the slider 80 is moved, together with the front lid 60, rearwardly relative to the cassette shell 20 (see FIG. 17). At this time, the back lid 70 is of course moved rearwardly relative to the cassette shell 20, whereby the back lid 70 is separated rearwardly from the magnetic tape 30, and thus is opened.

The slider 80 is moved (slid) rearward on the projecting ribs 27 formed on the upper surface 25 of the cassette shell 20 in such a manner that a suitable gap is kept between the lower surface of the slider 80 and the window 26 formed on the upper surface portion 25 of the cassette shell 20. As a result, the window 26 is prevented from being damaged due to rubbing by the slider 80 when the slider 80 is moved forward and rearward.

Since the contact portions 160a of the cassette pressing springs 160 press the portions corresponding to the right and left projecting ribs 27 of the cassette shell 20, the slider 80 is not deformed. As a result, it is possible to stabilize the sliding motion of the slider 80 on the cassette shell 20.

At the time of insertion of the tape cassette 10 in the cassette holder 150, the side butting portions 22b of the tape extraction portions 22 of the tape cassette 10 are guided by the lead-in edges 159b of the side receiving pieces 159 of the cassette holder 150, whereby the positioning of the tape cassette 10 to the cassette holder 150 in the direction from side to side can be achieved. Subsequently, the side butting portions 22b and the upper butting portions 22c are brought into contact with the side receiving portions 159a of the side receiving pieces 159 and the upper receiving portions 158a of the upper receiving pieces 158. At this time, the insertion of the tape cassette 10 in the cassette holder 150 is ended (see FIG. 17).

Since the positioning of the tape cassette 10 to the cassette holder 150 in the insertion direction can be performed at the four portions, that is, at the two upper portions and the two side portions, it is possible to ensure the positioning of the tape cassette 10 and to make the size of each of the butting portions 22b and 22c and the receiving portions 158a and 159a relatively small (see FIG. 2).

In addition, since the front lid 60 is brought into elastic contact with the upper surface of the cassette shell 20, the elastic force of the torsion coil spring 190 does not act to float the cassette shell 20 from the cassette holder 150. That is to say, the elastic force of the torsion coil spring 190 only acts to bring the front lid 60 into elastic contact with the upper surface of the cassette shell 20 (see FIG. 17).

Figure 10:
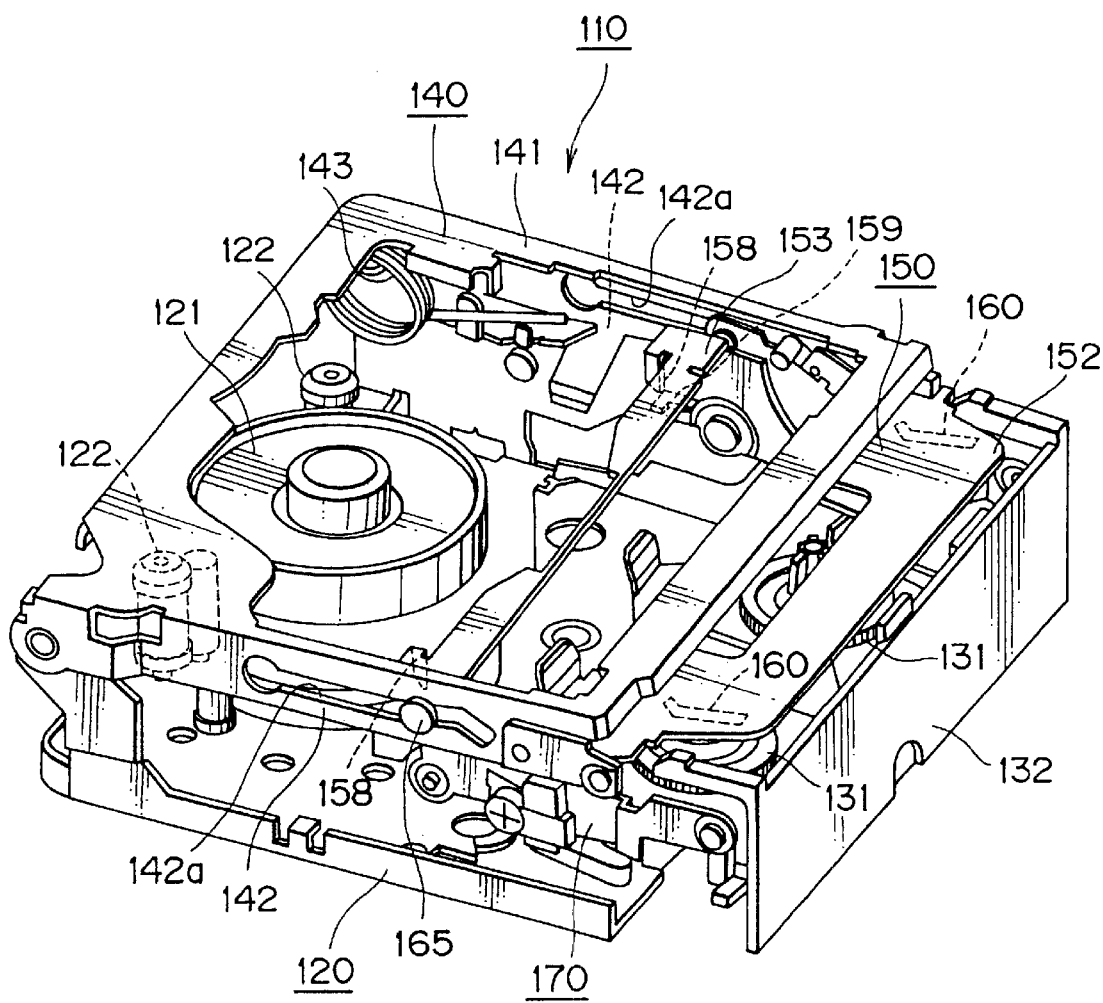
FIG. 10 is a schematic perspective view of the tape drive apparatus, showing a state in which the cassette holder is moved downward and a slide chassis is located at an extraction position.

After the tape cassette 10 is inserted in the cassette holder 150 up to the insertion end position, the movable frame 140 is turned downwardly, and the cassette holder 150 is moved downwardly along with the downwardly turning of the movable frame 140. When the cassette holder 150 is moved downward to the lower limit of a downward movement range (see FIG. 10), the reel bases 131 provided on the slide chassis 130 are inserted in the cassette shell 20 through the reel base through-holes 24, and reel engagement shafts 131a of the reel bases 131 are engaged in the reel base engagement holes 40a and 50a of the tape reels 40 and 50. The tape extraction guides 122, the pinch roller (not shown), and the like provided on the main chassis 120 are then located in the mouth portion 21.

Figure 11:
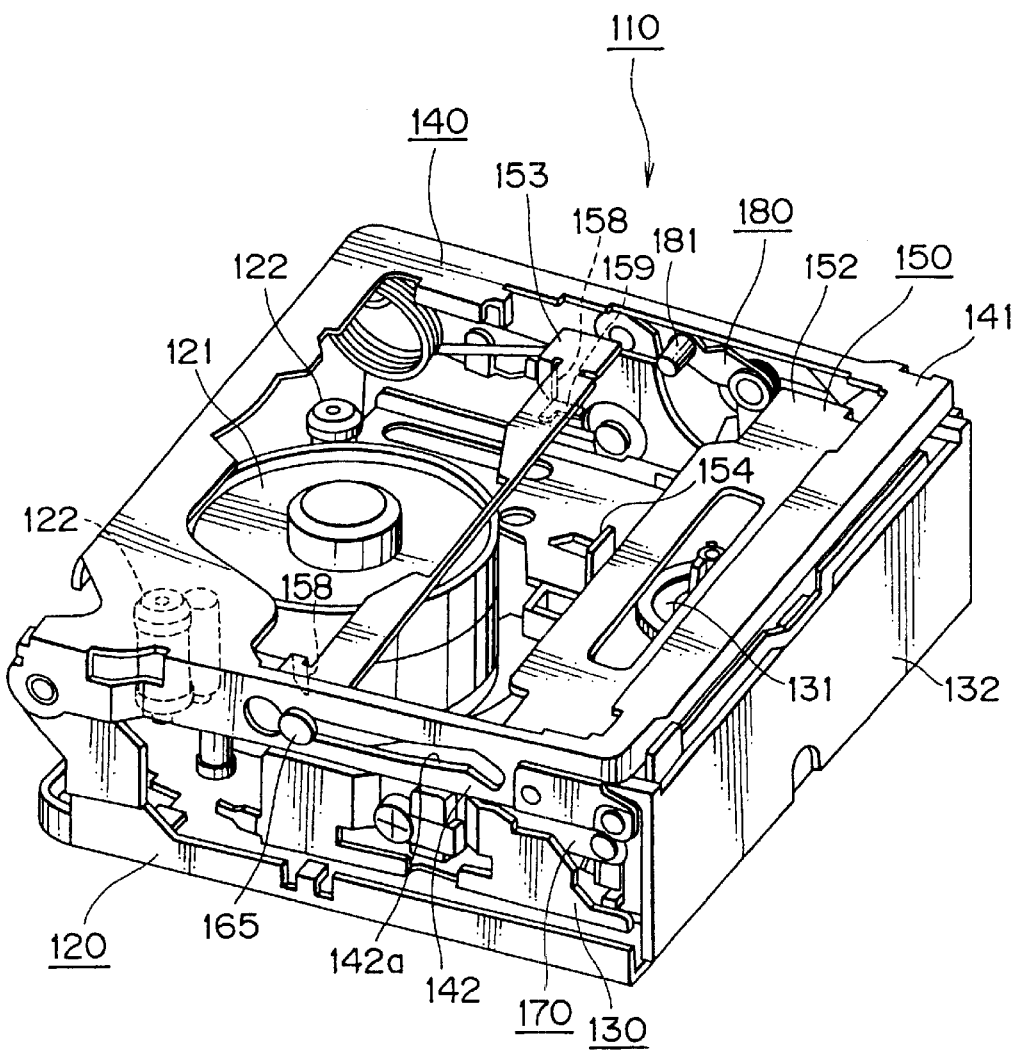
FIG. 11 is a schematic perspective view of the tape drive apparatus, showing a state in which the slide chassis is drawn to a recording/reproducing position.

The slide chassis 130 is then moved to the depth of the main chassis 120, to reach a specific extraction position (see FIG. 11).

After the slide chassis 130 reaches the specific extraction position, the tape extraction guides 122, the pinch roller, and the like are moved to specific positions, to extract the magnetic tape 30 from the cassette shell 20, wind the magnetic tape 30 around a rotary head drum 121 at a specific winding angle, and form a specific tape path.

After the recording or reproducing on or from the magnetic tape 30 is ended, the tape extraction guides 122, the pinch roller, and the like are moved in the mouth portion 21, and an excessive portion of the magnetic tape 30 is wound around one tape reel 40.

Figure 8:
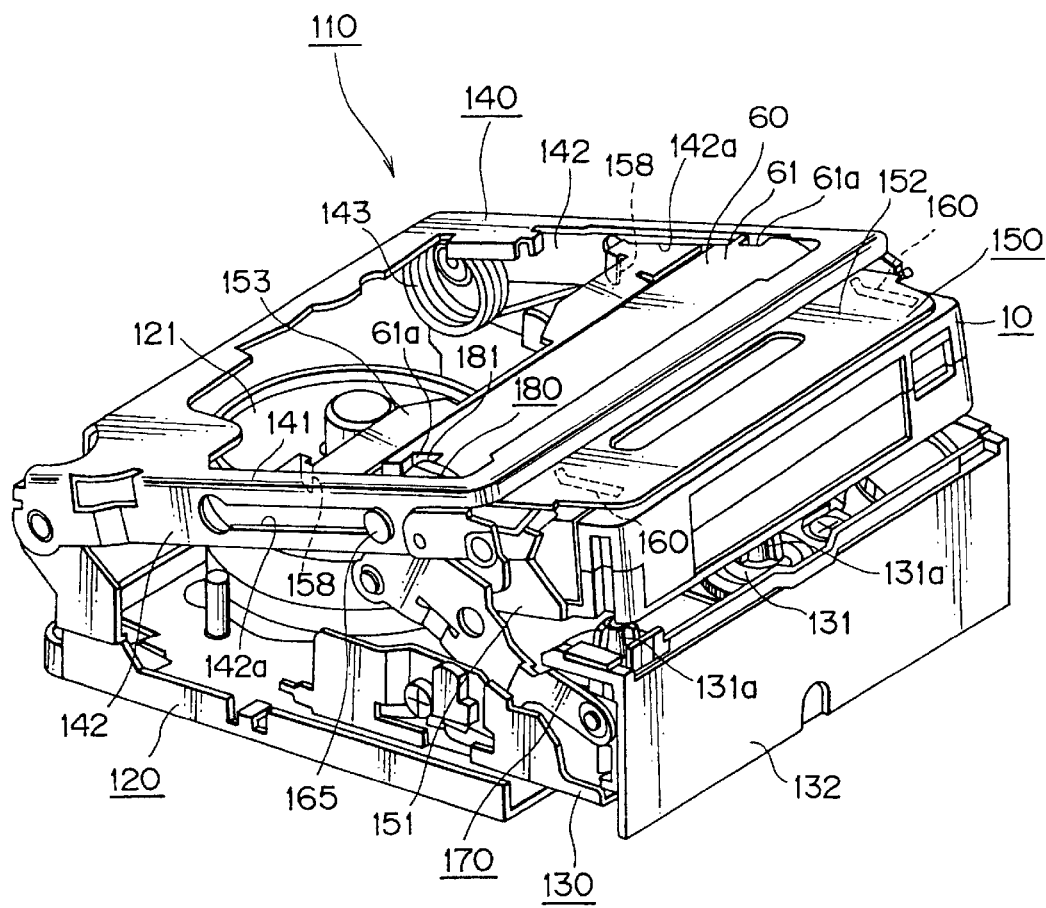
FIG. 8 is a schematic perspective view of the tape drive apparatus, showing a state in which the tape cassette is inserted in the cassette holder located at the eject position.
Figure 9:
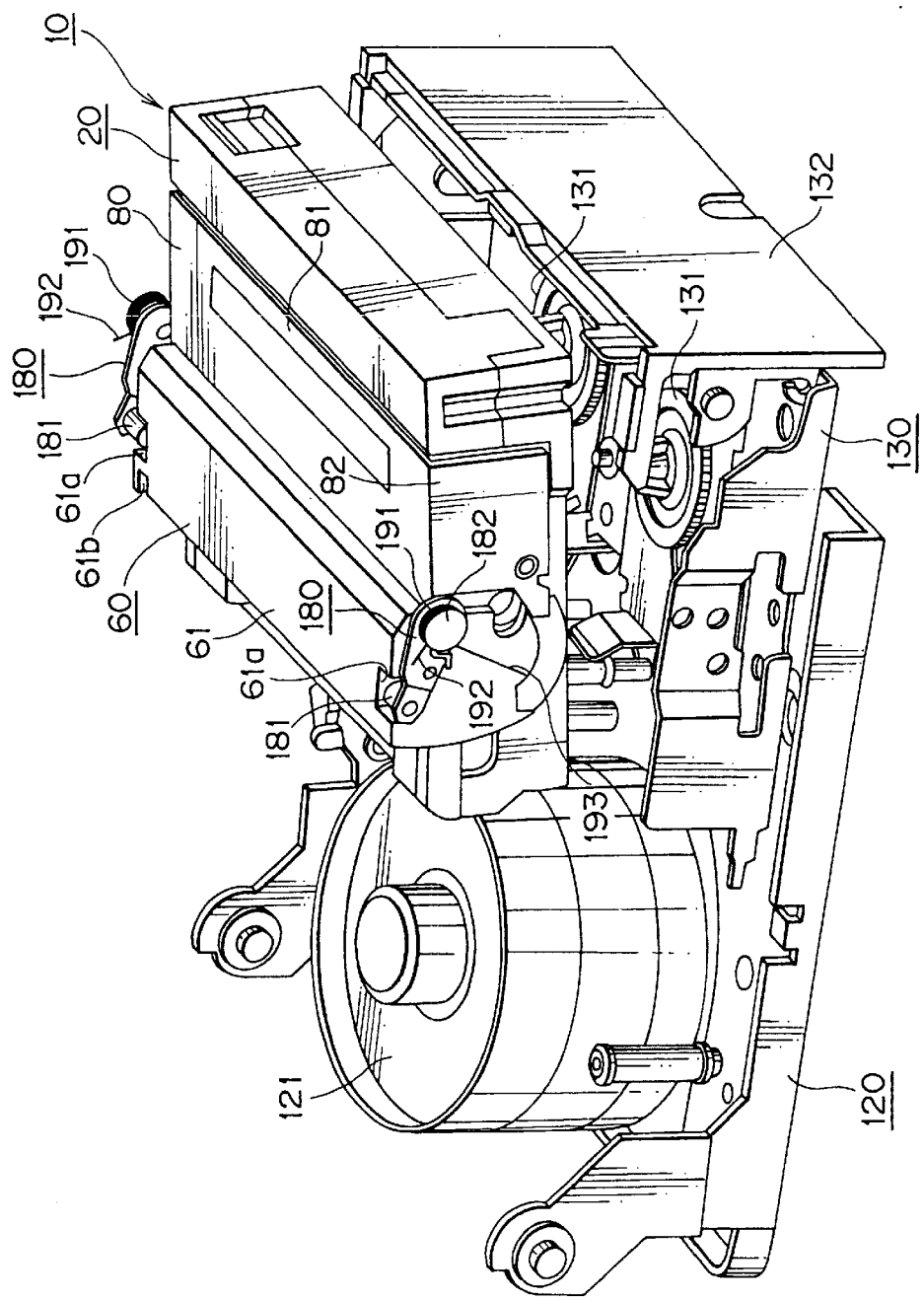
FIG. 9 is a schematic perspective view of the tape drive apparatus, showing the state shown in FIG. 7 with parts partial cutaway.

After that, the slide chassis 130 is returned up to the above-described extraction position, and the movable frame 140 is turned upward to locate the cassette holder 150 at the eject position (see FIG. 8).

Figure 18:
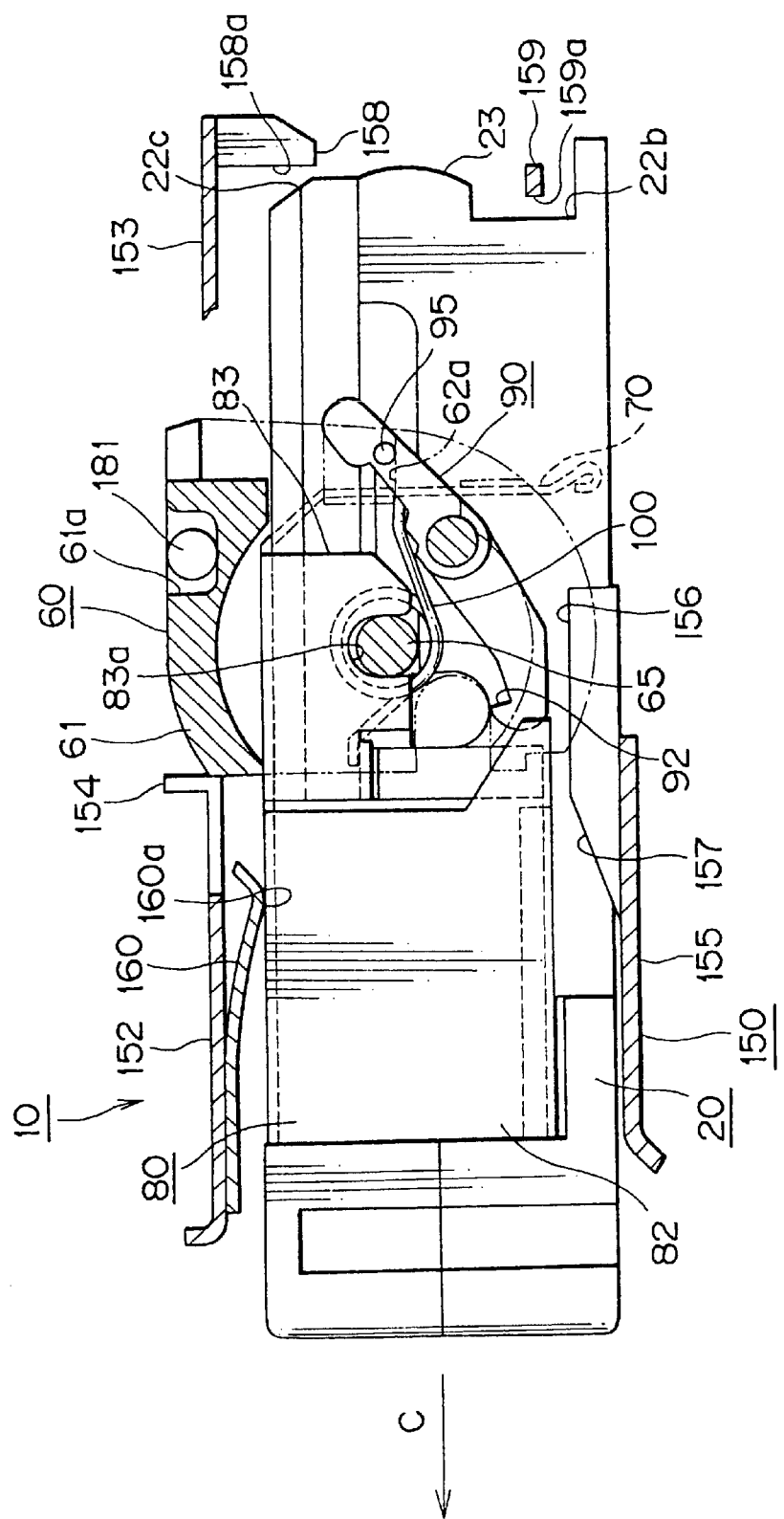
FIG. 18 is a schematic left side view, with parts partiallycut away, illustrating a further step of the process of insertion and removal of the tape cassette in and from the tape drive apparatus, in which the tape cassette is started to be drawn from the cassette holder.

In this state, a portion, projecting from the front end of the cassette holder 150, of the tape cassette 10 can be pulled out of the cassette holder 150 by an operator. The tape cassette 10 is thus moved in the eject direction, that is, the direction C (see FIG. 18).

When the tape cassette 10 is moved in the direction C, the lid pressing piece 154 provided at the central portion of the front side upper surface plate 152 of the cassette holder 150 relatively presses a central portion of an upper end portion of the front surface portion 61 of the front lid 60 in the direction reversed to the direction C, whereby the front lid 60 and the slider 80 (with which the back lid 70 is integrated) are moved to the front end of the cassette shell 20. At this time, since the central portion of the upper end of the front surface portion 61 of the front lid 60, a movement force is given with a good balance kept on the right and left sides.

Figure 19:
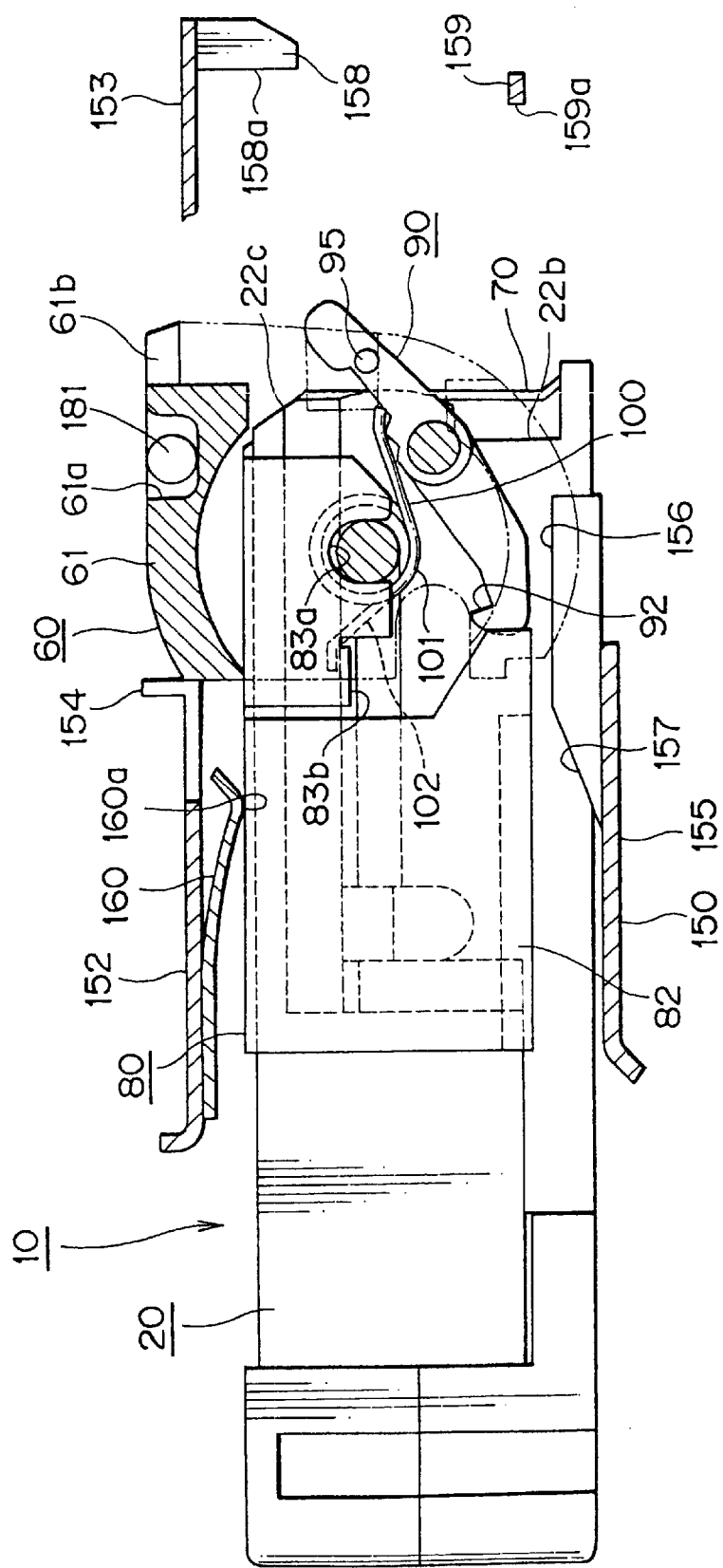
FIG. 19 is a schematic left side view, with parts partiallycut away, illustrating a further step of the process of insertion and removal of the tape cassette in and from the tape drive apparatus, in which the slider reaches the front limit of the movement range.
Figure 20:
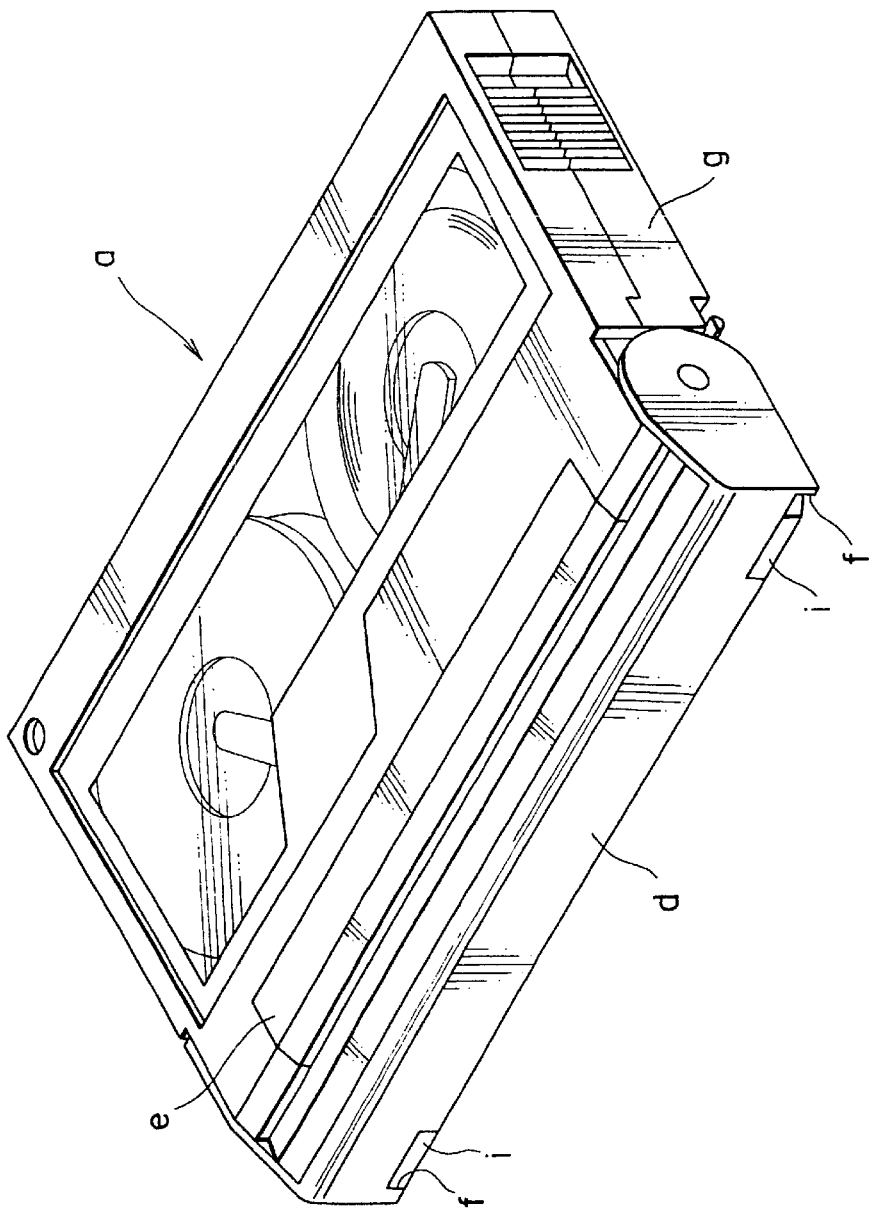
FIG. 20 is a perspective view of a related art tape cassette, showing a lid closed state.
Figure 21:
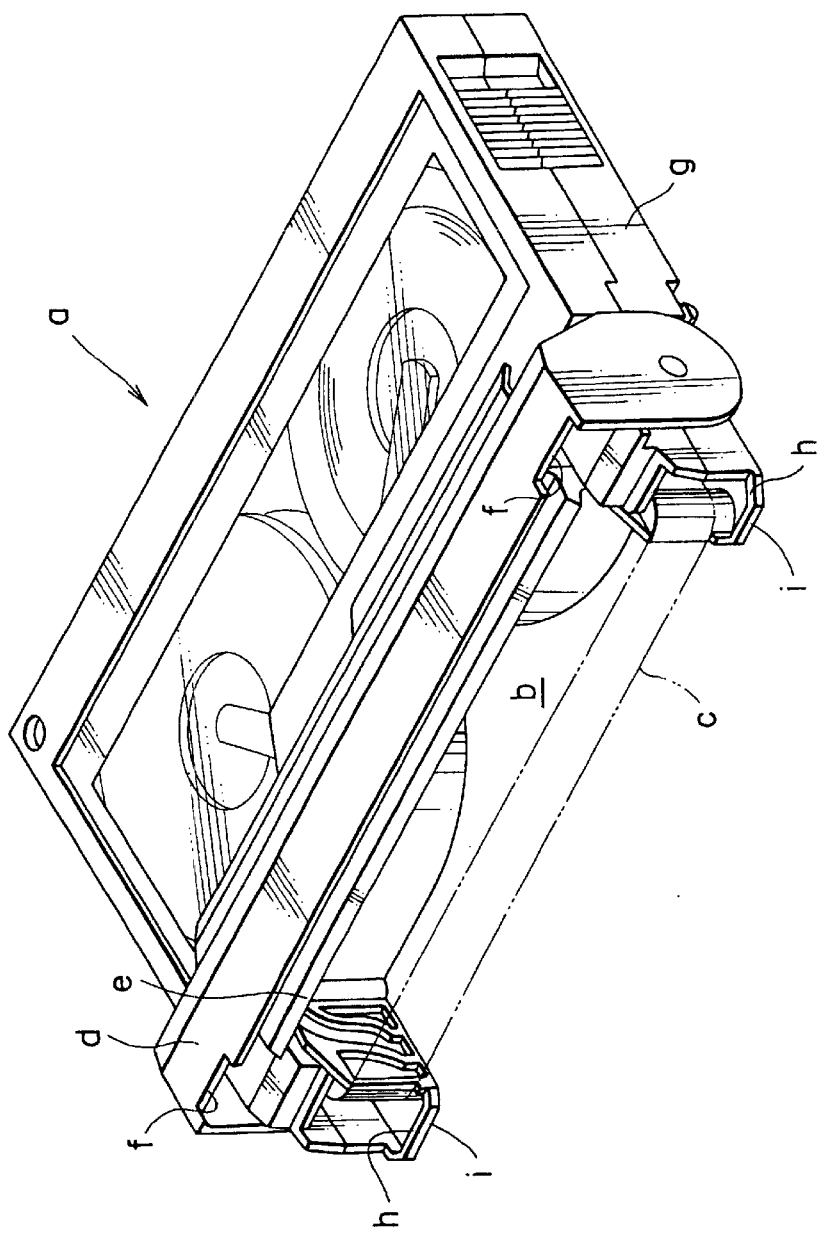
FIG. 21 is a perspective view of the related art tape cassette, showing a lid opened state.
Figure 22:
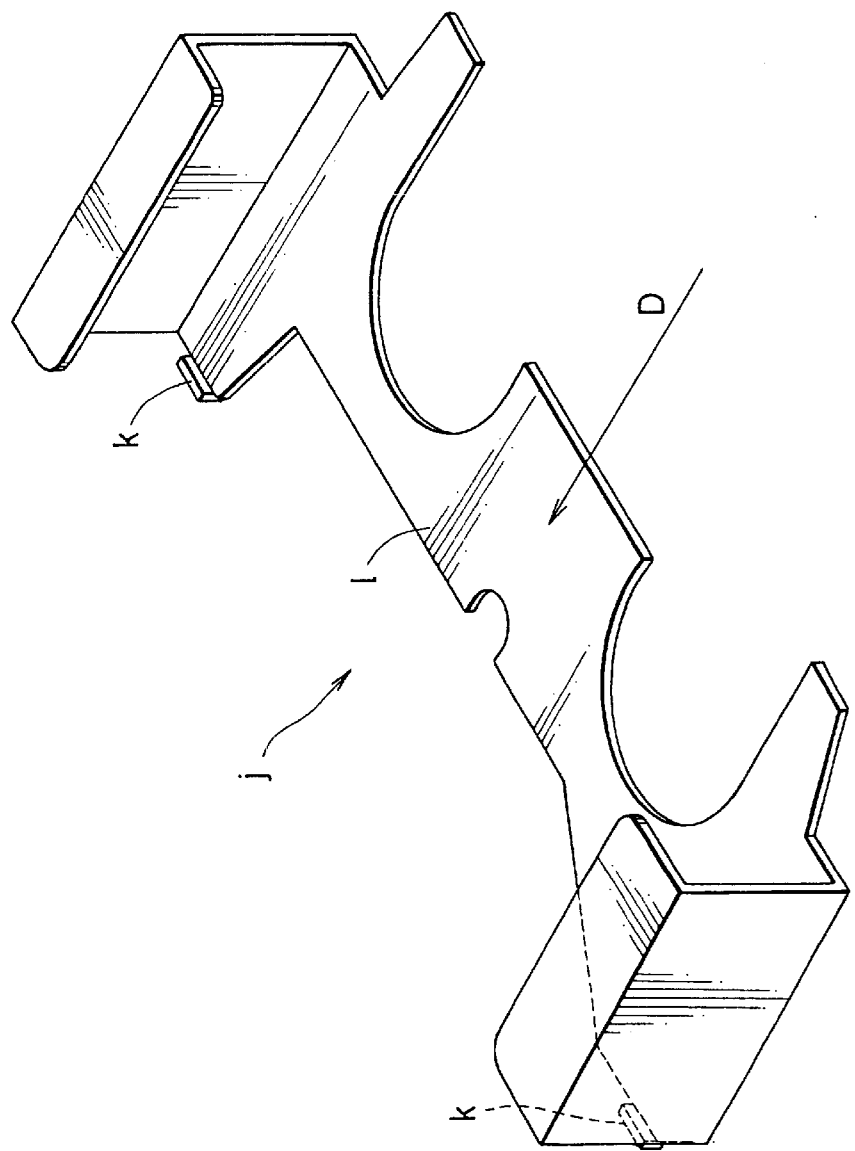
FIG. 22 is a perspective view showing a related art cassette holder.

When the slider 80 reaches the front limit of the movement range (see FIG. 19), since the lower end portions of the thick portions 63 of the front lid 60 are removed from the upper surface of the cassette shell 20, the front lid 60 becomes turnable downwardly. The front lid 60 is turned downwardly by the biasing force of the torsion coil spring 100 applied thereto via the lid lock member 90; to reach the lid closing position, thereby covering the magnetic tape 30 in cooperation with the back lid 70 being moved forward. The lock claw 92 of the lid lock member 90 then locks the upper surface of the sliding projection 83b of the slider 80. After that, the tape cassette 10 is removed from the cassette holder 150.

In the above-described embodiment, the side butting portions 22b and the upper butting portions 22c of the opening edges of the tape extraction portions 22 of the cassette tape 20 are brought into contact with the side receiving portions 159a and the upper receiving portions 158a, respectively; however, the present invention is not limited thereto. For example, a plurality of butting portions may be provided on each of upper and lower portions or each of side and upper portions on the cassette shell 20 side. Similarly, a plurality of receiving portions may be provided on each of upper and lower portions or each of side and upper portions on the cassette holder 150 side.

While the preferred embodiment of the present invention has been described using specific terms, such description is for illustrative purposes only, and it is to be understood that changes and variations may be made without departing from the spirit or scope of the following claim.

What is claimed is:

1. A tape cassette, which includes a mouth portion provided in a front portion of a cassette shell in such a manner as to be opened forward, upward, and downward, part of a recording medium being positioned to cross a front end of the mouth portion; and a front lid for covering a front side of the recording medium, the front lid being opened when the tape cassette is inserted in a cassette holder, and which is loaded in a tape drive apparatus by a manner of inserting said tape cassette in said cassette holder and then moving said cassette holder relative to a chassis of said tape drive apparatus, comprising:
a plurality of butting portions to be brought into contact with said cassette holder when said tape cassette is inserted in said cassette holder, said butting portions including a pair of upper butting portions and a pair of side butting portions with a respective one of each pair being provided on each of right and left sides of a front end portion of said cassette shell.

2. A tape cassette according to claim 1, wherein said plurality of butting portions are completely covered with said front lid in a lid closed state of said front lid.

3. A tape cassette according to claim 1, wherein each one of the upper butting portions extending in a direction parallel to the recording medium crossing the front end and each one of the side butting portions extending in another direction perpendicular to the recording medium crossing the front end.

4. A tape cassette according to claim 3, wherein the recording medium is disposed between the pair of side butting portions and the recording medium as viewed in cross-section passes underneath respective ones of the pair of upper butting portions.

5. A tape cassette according to claim 4, wherein each one of the pair of the upper butting portions and each one of the pair of the side butting portions have a rectangular configuration.

6. A cassette holder for holding a tape cassette inserted therein, which is provided in such a manner as to be movable relative to a chassis of a tape drive apparatus for loading said tape cassette at a specific loading position in said tape drive apparatus, said tape cassette having a plurality of butting portions including a pair of upper butting portions and a pair of side butting portions with a respective one of each pair and being provided on each of right and left sides of a front end portion of the tape cassette, the cassette holder comprising:

a plurality of receiving portions for receiving said tape cassette in the insertion direction, said plurality of receiving portions including a pair of upper receiving portions and a pair of side receiving portions with a respective one of each pair of the upper receiving portions and the side receiving portions being provided on each of right and left sides of said cassette holder so that, upon insertion of said tape cassette in said cassette holder, respective ones of the upper butting portions contact the upper receiving portions and respective ones of the side butting portions contact the side receiving portions.

* * * * *